(12) United States Patent
Sathyamurthy et al.

(10) Patent No.: US 12,492,118 B2
(45) Date of Patent: Dec. 9, 2025

(54) DOORBELL CAMERA HAVING ACTIVE COOLING

(71) Applicant: Frore Systems Inc., San Jose, CA (US)

(72) Inventors: Prabhu Sathyamurthy, San Jose, CA (US); Nilesh Sudhir Hasabnis, Santa Clara, CA (US); Suryaprakash Ganti, Los Altos, CA (US); Seshagiri Rao Madhavapeddy, La Jolla, CA (US)

(73) Assignee: Frore Systems Inc., San Jose, CA (US)

( * ) Notice: Subject to any disclaimer, the term of this patent is extended or adjusted under 35 U.S.C. 154(b) by 128 days.

(21) Appl. No.: 18/630,881

(22) Filed: Apr. 9, 2024

(65) Prior Publication Data

US 2024/0336475 A1    Oct. 10, 2024

Related U.S. Application Data

(60) Provisional application No. 63/458,873, filed on Apr. 12, 2023, provisional application No. 63/458,416, filed on Apr. 10, 2023.

(51) Int. Cl.
| | |
|---|---|
| *B81B 3/00* | (2006.01) |
| *G06F 1/20* | (2006.01) |
| *G08B 3/10* | (2006.01) |
| *H04N 7/18* | (2006.01) |
| *H05K 7/20* | (2006.01) |

(52) U.S. Cl.
CPC .............. *B81B 3/0081* (2013.01); *G06F 1/20* (2013.01); *G08B 3/1008* (2013.01); *H04N 7/186* (2013.01); *B81B 2201/036* (2013.01); *B81B 2203/0118* (2013.01); *B81B 2207/11* (2013.01); *H05K 7/20154* (2013.01); *H05K 7/20272* (2013.01)

(58) Field of Classification Search
CPC ............ B81B 3/0081; B81B 2201/036; B81B 2203/0118; B81B 2207/11; G06F 1/20; G08B 3/1008; H04N 7/186; H05K 7/20154; H05K 7/20272
USPC ......................................................... 165/186
See application file for complete search history.

(56) References Cited

U.S. PATENT DOCUMENTS

| | | | |
|---|---|---|---|
| 9,532,115 B2 * | 12/2016 | Mickelsen | ........... H04N 21/242 |
| 11,464,140 B2 | 10/2022 | Yalamarthy | |
| 11,510,341 B2 | 11/2022 | Mukundan | |
| 11,692,776 B2 * | 7/2023 | Sathyamurthy | ....... H01L 23/467 |
| | | | 165/80.2 |
| 11,796,262 B2 | 10/2023 | Mukundan | |
| 12,089,374 B2 * | 9/2024 | Sathyamurthy | ....... F04D 29/582 |

(Continued)

FOREIGN PATENT DOCUMENTS

| | | | | |
|---|---|---|---|---|
| WO | WO-2023220474 A1 * | 11/2023 | ............. | E05B 47/00 |
| WO | WO-2024159150 A1 * | 8/2024 | ......... | H05K 7/20172 |

*Primary Examiner* — Jon T. Schermerhorn, Jr.
(74) *Attorney, Agent, or Firm* — Van Pelt, Yi & James LLP

(57) ABSTRACT

A doorbell system is disclosed. The doorbell system includes a housing, a heat-generating structure, and a cooling system. The housing is configured to be coupled to a structure. The heat-generating structure and cooling system are coupled with the housing. The cooling system includes at least one active cooling cell. The heat-generating structure may be thermally coupled with the cooling system. The active cooling cell(s) are configured to utilize vibrational motion to drive a fluid for transferring heat from the heat-generating structure. The cooling system is coupled with and contained by the housing.

20 Claims, 11 Drawing Sheets

(56) References Cited

U.S. PATENT DOCUMENTS

| | | | |
|---|---|---|---|
| 2020/0281521 A1* | 9/2020 | Cail | A61B 5/02055 |
| 2024/0256013 A1* | 8/2024 | Ganti | G06F 1/203 |
| 2024/0336475 A1* | 10/2024 | Sathyamurthy | G06F 1/20 |
| 2024/0338062 A1* | 10/2024 | Sathyamurthy | G06F 1/203 |
| 2024/0373593 A1* | 11/2024 | Sathyamurthy | F04D 33/00 |

* cited by examiner

DOORBELL CAMERA HAVING ACTIVE COOLING

CROSS REFERENCE TO OTHER APPLICATIONS

This application claims priority to U.S. Provisional Patent Application No. 63/458,416 entitled DOORBELL CAMERA HAVING ACTIVE COOLING filed Apr. 10, 2023 and U.S. Provisional Patent Application No. 63/458,873 entitled MINI PC HAVING ACTIVE COOLING filed Apr. 12, 2023 both of which are incorporated herein by reference for all purposes.

BACKGROUND OF THE INVENTION

Electronic devices generate heat during use. For many electronic devices, passive cooling has been sufficient for operation. For example, mini personal computers (mini PCs), lighting systems such as light emitting diode (LED) lighting systems, and doorbells (including newer doorbell cameras) are passively cooled. Although such devices generate heat, components such as heat spreaders and/or other heat sinks have traditionally been used for heat management due to dust and vibration concerns. However, newer electronic devices may be desired to have their functionality and/or usability improved. For example, doorbell cameras may be desired to provide added functionality and/or higher resolution video. Various mechanisms have been proposed to address the generation of heat. Fans may be used to drive air through larger electronic devices, such as desktop computers. However, some electronic devices may not be capable of incorporating fans. In addition, fans may be unable to adequately cool smaller electronic devices or may introduce undesirable side effects, such as jitter or audible noise, dust accumulation etc. Consequently, additional cooling solutions for electronic devices that are traditionally passively are desired.

BRIEF DESCRIPTION OF THE DRAWINGS

Various embodiments of the invention are disclosed in the following detailed description and the accompanying drawings.

DETAILED DESCRIPTION

Figure 1A:
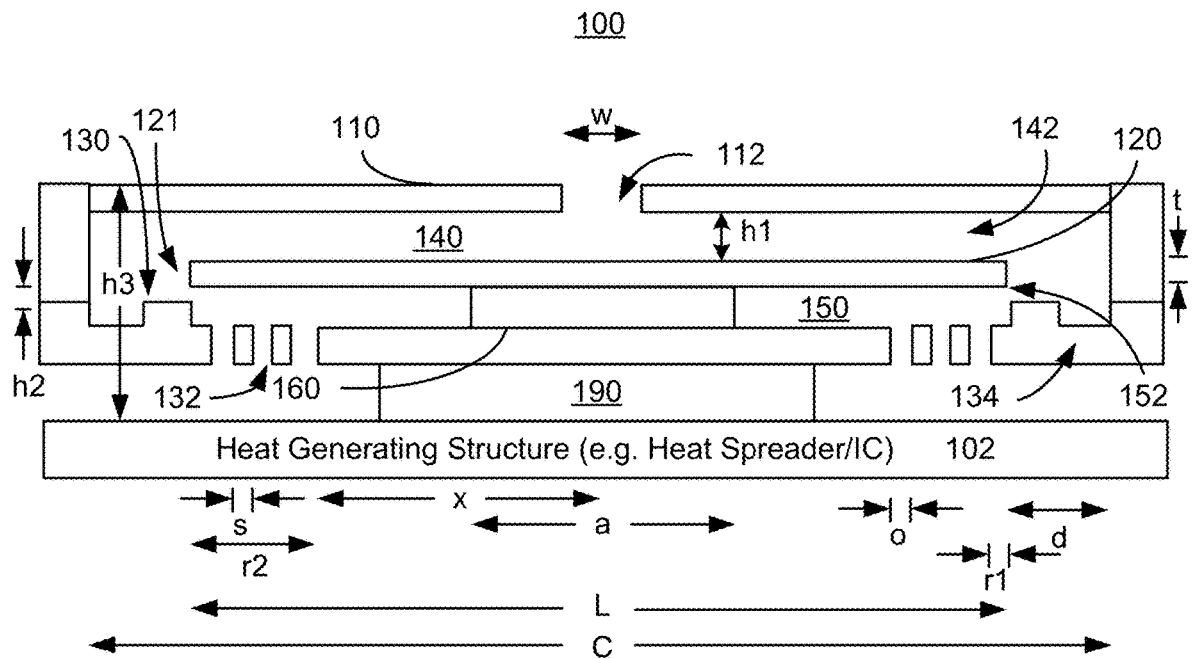
FIGS. 1A-1G depict an embodiment of an active MEMS cooling system including a centrally anchored cooling element.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Many electronic devices use passive cooling for managing heat. For example, mini personal computers (mini PCs) are computers that have a significantly smaller form factor than a desktop computer, consume less power than a traditional desktop computer and are portable. Mini PCs may also have somewhat limited computing power, may have limited upgradeability, and may be less expensive than a desktop computer. For example, a mini PC may be on the order of 3-10 inches wide, 3-10 inches deep, and 2-4 inches tall. Such mini PCs are generally suited for everyday tasks such as web browsing, media playback, and word processing. They are also used in dusty environments like restaurants, industrial complexes, and similar sites. Mini PCs are passively cooled, typically using a heat sink due to dust and vibration concerns. The heat sink may be integrated into the cover (or housing) of the mini PC and is generally relatively large and heavy.

Similarly, doorbell cameras generally have limited computing power and are passively cooled. In addition to providing a chime when activated, a doorbell camera captures and processes still and/or video images. The doorbell cameras may also be capable of detecting motion. Thus, image capture may occur in response to activation of the doorbell or in response to motion being detected. The doorbell camera typically has a heat spreader or heat sink to passively cool the electronics (e.g. a system-on-a chip, or SoC). For doorbell cameras, removal or mitigation of video jitter due to vibration may be of utmost importance. Consequently, active cooling solutions such as fans may be inappropriate for use with doorbell cameras.

Lighting systems, such as light-emitting diode (LED) lighting systems, may be mounted in a ceiling to provide recessed lighting. An LED lighting system may include a housing that contains an LED module and an adjustable frame that mounts the LED module to the housing. A typical LED module may draw on the order of fifteen Watts of power during use. Although cooler than incandescent lights, the LED module does generate heat. In order to manage the heat generated by the LED module, a large heat sink is generally used. For example, an LED lighting system including an LED module that consumes approximately fifteen Watts of power may weigh on the order of three kilograms and have a volume of over five thousand five hundred cubic centimeters. A significant fraction of the volume and weight are due to the heat sink. Current active cooling solutions like fans are not used as they induce vibration which severely impacts the performance of the LED lighting system.

Although electronic devices such as mini PCs, doorbell cameras, and LED lighting systems may be used, there are drawbacks. Heat sinks may be large, bulky, and/or heavy and may offer limited heat management. Moreover, some newer electronic devices may be desired have enhanced computing performance, which consumes more power. As a result, passive cooling may be incapable of sufficiently transferring the heat generated from the electronic device. Consequently, additional cooling solutions for electronic devices that are traditionally passively are desired.

A doorbell system is disclosed. The doorbell system includes a housing, a heat-generating structure, and a cooling system. The housing is configured to be coupled to a structure. The heat-generating structure and cooling system are coupled with the housing. The cooling system includes at least one active cooling cell. The heat-generating structure is thermally coupled with the cooling system. The active cooling cell(s) are configured to utilize vibrational motion to drive a fluid for transferring heat from the heat-generating structure. The cooling system is coupled with and contained by the housing. In some embodiments, the doorbell system includes a camera that is coupled with the housing and the heat-generating structure. The heat-generating structure includes a processor. For example, the processor may be used to process image data from the camera. The housing may have a smallest outside dimension of at least ten millimeters and not exceeding sixty millimeters. In some embodiments, the smallest outside dimension is not more than forty millimeters.

The cooling cell(s) includes at least one cooling element configured to undergo the vibrational motion when driven. The cooling system may also include a heat spreader thermally coupled with the cooling element(s). The active cooling cell(s) may further include a top plate having at least one inlet therein and an orifice plate having orifices therein. The cooling element(s) are between the top plate and the orifice plate. The vibrational motion of the cooling element(s) drives the fluid through the orifices such that the fluid has a speed of at least thirty meters per second after exiting at least one of the orifices. In some embodiments, the housing has aperture(s) therein. The aperture allows a fluid flow through the housing. The aperture(s) may include an inlet vent on a first side of the housing and an exit vent on a second side of the housing. In some embodiments, the doorbell system includes dust guard(s) coupled with the inlet(s) to the top plate and/or the inlet vent to the housing.

A doorbell system including a housing, a camera, a heat-generating structure, and a cooling system is described. The housing is configured to be coupled to a wall of a structure, such as a house. The heat-generating structure is coupled with the camera and the housing. The cooling system includes active cooling cells and is coupled with and contained by the housing. The heat-generating structure is thermally coupled with the cooling system. Each of the active cooling cells includes a top plate, a bottom plate, and a cooling element. The top plate has an inlet therein. The bottom plate has orifices therein. The cooling element is between the top plate and the bottom plate. The cooling element is configured to utilize vibrational motion when driven to draw a fluid into each active cooling cell via the inlet, direct fluid toward the bottom plate, and drive the fluid through the orifices such that the fluid has a speed of at least thirty meters per second after leaving orifices. The fluid transfers heat from the heat-generating structure.

A method for cooling a system is described. The method includes driving a cooling element of an active cooling cell in a cooling system to induce a vibrational motion at a frequency. In some embodiments, the frequency corresponds to a resonant frequency for the cooling element. The cooling system is in a doorbell system including a housing and a heat-generating structure coupled with the housing. The heat-generating structure is also thermally coupled with the cooling system. The cooling element is configured to undergo vibrational motion when driven to direct a fluid for transferring heat from the heat-generating structure. The cooling system is coupled with and contained by the housing.

In some embodiments, the doorbell system includes a camera that is coupled with the housing and the heat-generating structure. In such embodiments, the heat-generating structure includes an integrated circuit. In some embodiments, the housing has a smallest outside dimension of at least ten millimeters and not more than sixty millimeters. The active cooling cell may include a top plate and a bottom plate. The top plate has at least one inlet therein. The orifice plate has orifices therein. The cooling element is between the top plate and the orifice plate. The vibrational motion of the cooling element drives the fluid through the orifices such that the fluid has a speed of at least thirty meters per second after exiting at least one of the orifices.

In some embodiments, the housing has at least one aperture therein. The aperture(s) allow a fluid flow through the housing. The doorbell system may further include a dust guard coupled with the aperture(s). The method may include driving the cooling element in response to at least one of a doorbell system camera being activated, a skin temperature of the housing reaching or exceeding a first threshold, the doorbell system being activated, or a heat-generating structure temperature reaching or exceeding a second threshold.

The doorbell systems and methods described herein include active cooling. Consequently, the electronics for the doorbell camera may draw more power while heat is transferred via active cooling. For example, the heat-generating structure may include a system-on-a chip (SoC) that processes image data from the camera. Active cooling may transfer heat from the SoC that allows for faster processing and/or processing of higher resolution image data. Other functionality might also be added to the doorbell system without overheating (or throttling) the processor. Consequently, performance of the doorbell camera may be improved.

Figure 1B:
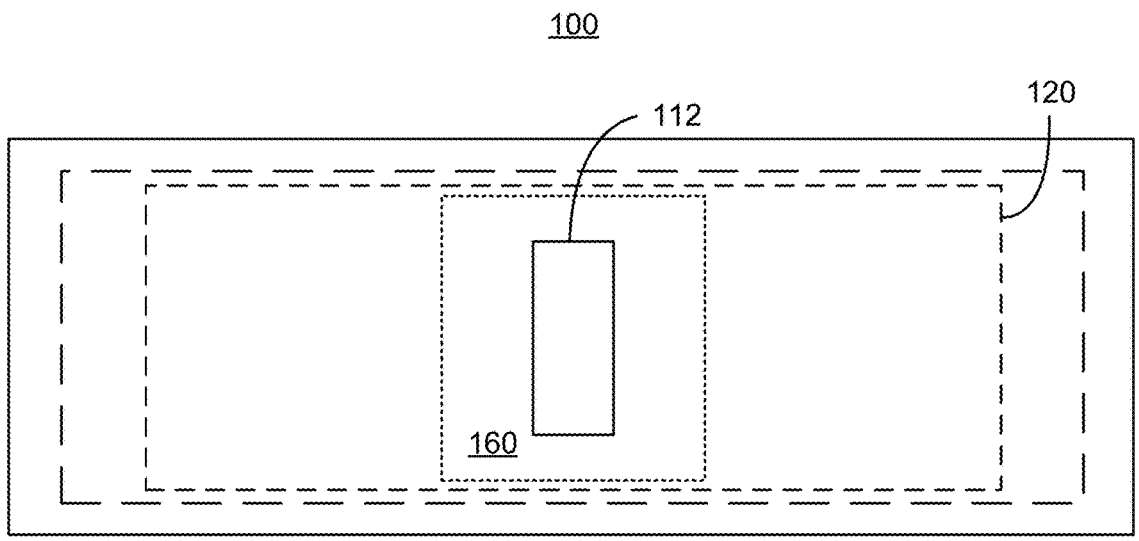
Figure 1C:
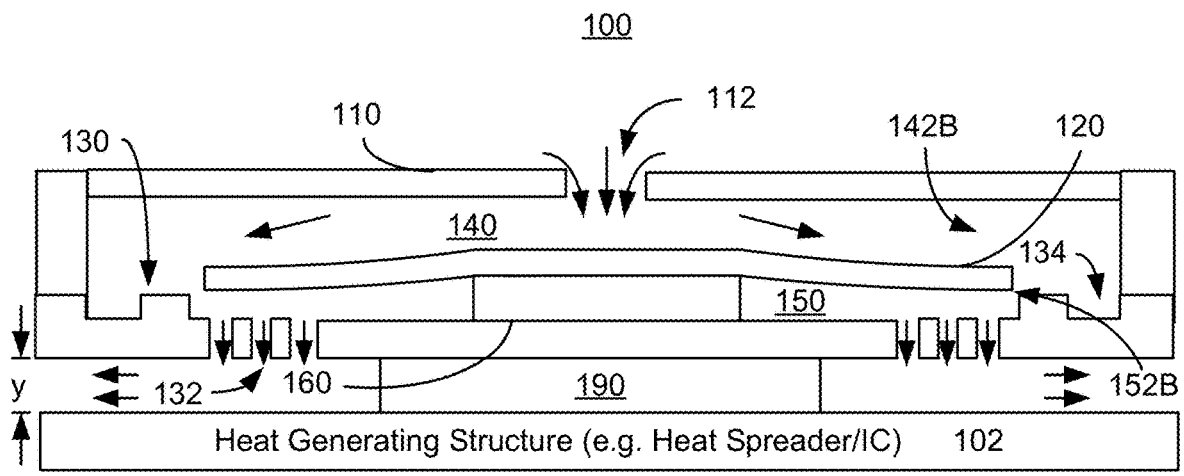
Figure 1D:
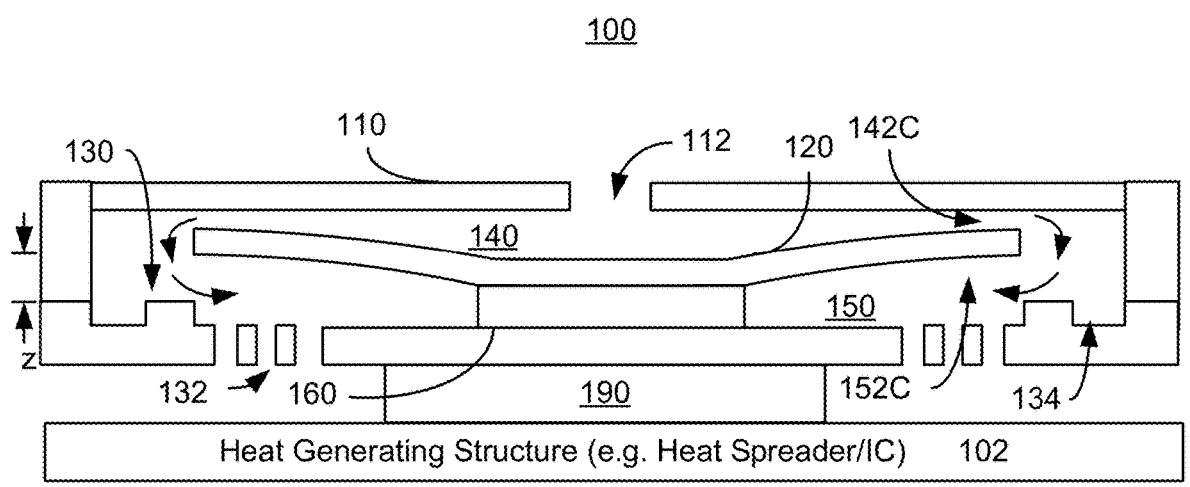
Figure 1E:
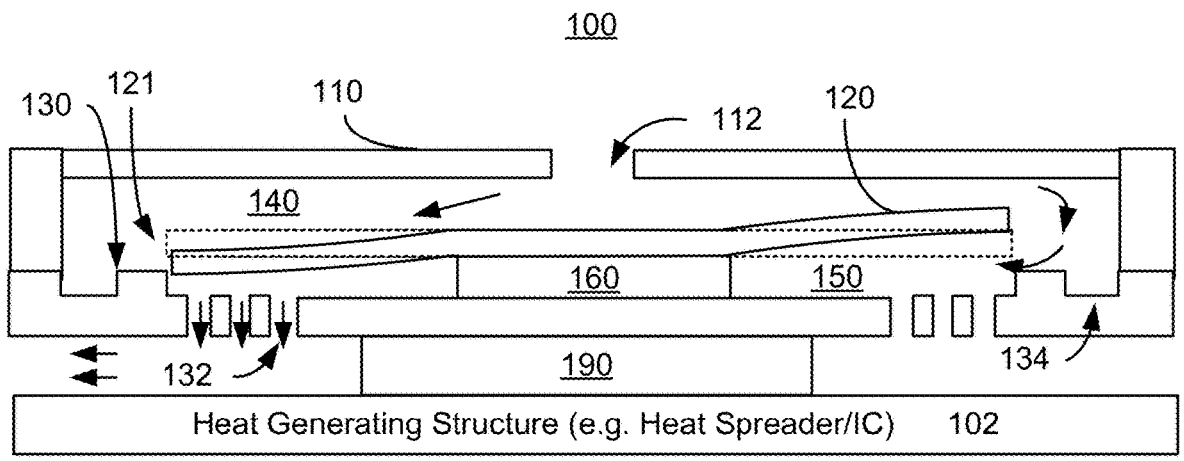
Figure 1F:
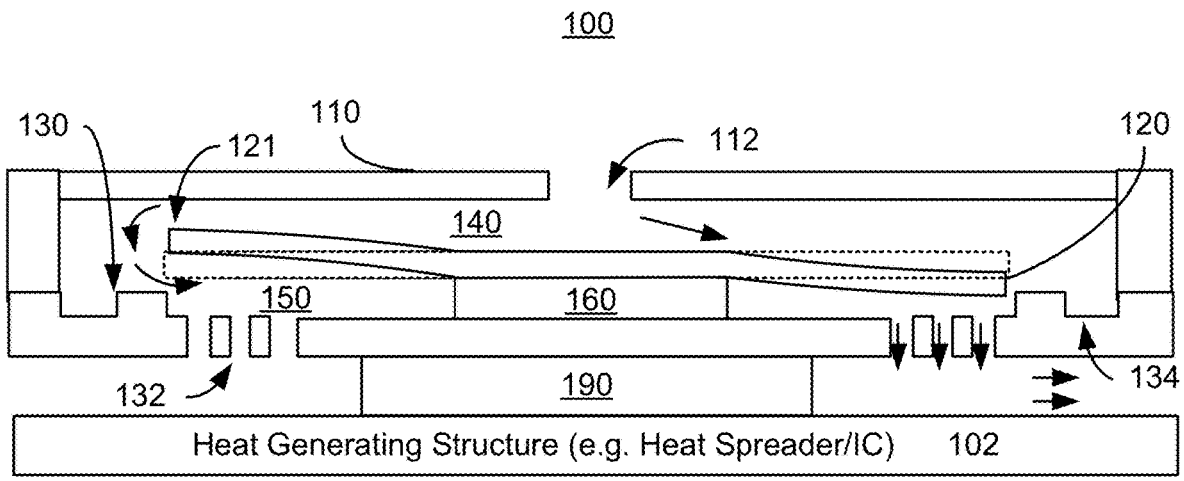
Figure 1G:
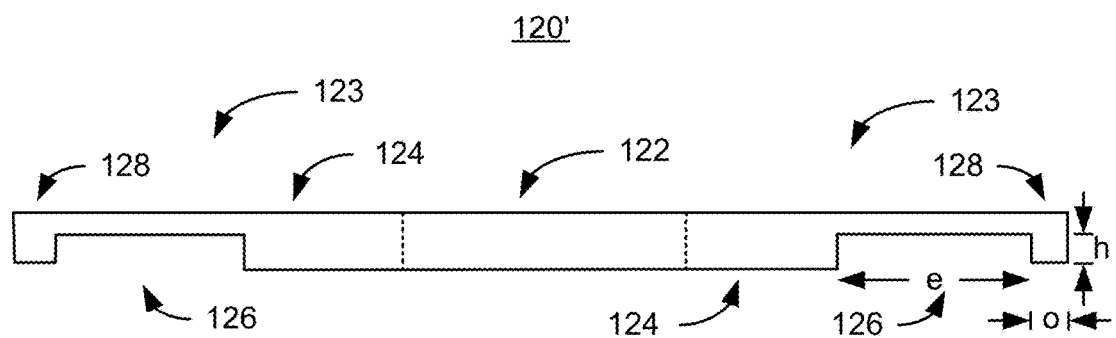

FIGS. 1A-1G are diagrams depicting an exemplary embodiment of active MEMS cooling system 100 usable with heat-generating structure 102 and including a centrally anchored cooling element 120 or 120'. Although termed a cooling system, MEMS system 100 and analogous systems described herein may be considered heat transfer systems and/or fluid transfer systems. Cooling element 120 is shown in FIGS. 1A-1F and cooling element 120' is shown in FIG. 1G. For clarity, only certain components are shown. FIGS. 1A-1G are not to scale. FIGS. 1A and 1B depict crosssectional and top views of cooling system 100 in a neutral position. FIGS. 1C-1D depict cooling system 100 during actuation for in-phase vibrational motion. FIGS. 1E-1F depict cooling system 100 during actuation for out-of-phase vibrational motion. Although shown as symmetric, cooling system 100 need not be.

Cooling system 100 includes top plate 110 having vent 112 therein, cooling element 120, orifice plate 130 having orifices 132 and cavities 134 therein, support structure (or "anchor") 160 and chambers 140 and 150 (collectively chamber 140/150) formed therein. Cooling element 120 is supported at its central region by anchor 160. Although termed a cooling element with respect to FIGS. 1A-1G, cooling element 120 and analogous elements described herein may also be considered actuators, vibrating elements, vibrating components, active components, and/or other terms indicating that the element is configured to undergo vibrational motion when activated (or energized) and/or to drive fluid through a system. Regions of cooling element 120 closer to and including portions of the cooling element's perimeter (e.g. tip 121) vibrate when actuated. In some embodiments, tip 121 of cooling element 120 includes a portion of the perimeter furthest from anchor 160 and undergoes the largest deflection during actuation of cooling element 120. For clarity, only one tip 121 of cooling element 120 is labeled in FIG. 1A. In some embodiments, vibration of portions of cooling element 120 may cause motion (e.g. rotation) of anchor 160. Also shown is pedestal 190 that connects orifice plate 130 to and offsets orifice plate 130 from heat-generating structure 102. In some embodiments, pedestal 190 also thermally couples orifice plate 130 to heat-generating structure 102. In some embodiments, an additional jet channel plate may be present and supported by pedestal 190. Thus orifice plate 130 and/or such a jet channel plate may be part or all of a bottom plate supported by pedestal 190. Thus, multiple plates and/or plate(s) having various structures may be used at the bottom plate for cooling system 100.

FIG. 1A depicts cooling system 100 in a neutral position. Thus, cooling element 120 is shown as substantially flat. For in-phase operation, cooling element 120 is driven to vibrate between positions shown in FIGS. 1C and 1D. This vibrational motion draws fluid (e.g. air) into vent 112, through chambers 140 and 150 and out orifices 132 at high speed and/or flow rates. For example, the speed at which the fluid impinges on heat-generating structure 102 may be at least thirty meters per second. In some embodiments, the fluid is driven by cooling element 120 toward heat-generating structure 102 at a speed of at least forty-five meters per second. In some embodiments, the fluid is driven toward heat-generating structure 102 by cooling element 120 at speeds of at least sixty meters per second. Other speeds may be possible in some embodiments. Cooling system 100 is also configured so that little or no fluid is drawn back into chamber 140/150 through orifices 132 by the vibrational motion of cooling element 120.

Heat-generating structure 102 is desired to be cooled by cooling system 100. In some embodiments, heat-generating structure 102 generates heat. For example, heat-generating structure may be an integrated circuit. In some embodiments, heat-generating structure 102 is desired to be cooled but does not generate heat itself. Heat-generating structure 102 may conduct heat (e.g. from a nearby object that generates heat). For example, heat-generating structure 102 might be a heat spreader or a vapor chamber. Thus, heat-generating structure 102 may include semiconductor component(s) including individual integrated circuit components such as processors, other integrated circuit(s) and/or chip package(s); sensor(s); optical device(s); one or more batteries; other component(s) of an electronic device such as a computing device; heat spreaders; heat pipes; other electronic component(s) and/or other device(s) desired to be cooled. In some embodiments, heat-generating structure 102 may be a thermally conductive part of a module containing cooling system 100. For example, cooling system 100 may be affixed to heat-generating structure 102, which may be coupled to another heat spreader, vapor chamber, integrated circuit, or other separate structure desired to be cooled.

The devices in which cooling system 100 is desired to be used may also have limited space in which to place a cooling system. For example, cooling system 100 may be used in computing devices. Such computing devices may include but are not limited to smartphones, tablet computers, laptop computers, tablets, two-in-one laptops, hand held gaming systems, digital cameras, virtual reality headsets, augmented reality headsets, mixed reality headsets and other devices that are thin. Cooling system 100 may be a micro-electro-mechanical system (MEMS) cooling system capable of residing within mobile computing devices and/or other devices having limited space in at least one dimension. For example, the total height, h3, of cooling system 100 (from the top of heat-generating structure 102 to the top of top plate 110) may be less than 2 millimeters. In some embodiments, the total height of cooling system 100 is not more than 1.5 millimeters. In some embodiments, this total height is not more than 1.1 millimeters. In some embodiments, the total height does not exceed one millimeter. In some embodiments, the total height does not exceed two hundred and fifty micrometers. Similarly, the distance between the bottom of orifice plate 130 and the top of heat-generating structure 102, y, may be small. In some embodiments, y is at least two hundred micrometers and not more than 1.2 millimeter. For example, y may be at least two hundred and fifty micrometers and not more than three hundred micrometers. In some embodiments, y is at least five hundred micrometers and not more than one millimeter. In some embodiments, y is at least two hundred micrometers and not more than three hundred micrometers. Thus, cooling system 100 is usable in computing devices and/or other devices having limited space in at least one dimension. However, nothing prevents the use of cooling system 100 in devices having fewer limitations on space and/or for purposes other than cooling. Although one cooling system 100 is shown (e.g. one cooling cell), multiple cooling systems 100 might be used in connection with heat-generating structure 102. For example, a one or two-dimensional array of cooling cells might be utilized.

Cooling system 100 is in communication with a fluid used to cool heat-generating structure 102. The fluid may be a gas and/or a liquid. For example, the fluid may be air. In some embodiments, the fluid includes fluid from outside of the device in which cooling system 100 resides (e.g. provided through external vents in the device). In some embodiments, the fluid circulates within the device in which cooling system 100 resides (e.g. in an enclosed device).

Cooling element 120 can be considered to divide the interior of active MEMS cooling system 100 into top chamber 140 and bottom chamber 150. Top chamber 140 is formed by cooling element 120, the sides, and top plate 110. Bottom chamber 150 is formed by orifice plate 130, the sides, cooling element 120 and anchor 160. Top chamber 140 and bottom chamber 150 are connected at the periphery of cooling element 120 and together form chamber 140/150 (e.g. an interior chamber of cooling system 100).

The size and configuration of top chamber 140 may be a function of the cell (cooling system 100) dimensions, cooling element 120 motion, and the frequency of operation. Top chamber 140 has a height, h1. The height of top chamber 140 may be selected to provide sufficient pressure to drive the fluid to bottom chamber 150 and through orifices 132 at the desired flow rate and/or speed. Top chamber 140 is also sufficiently tall that cooling element 120 does not contact top plate 110 when actuated. The magnitude of the deflection of cooling element 120 may also be tailored by, for example, changing the driving voltage of the signal used to drive vibration of cooling element 120. In some embodiments, the height of top chamber 140 is at least fifty micrometers and not more than five hundred micrometers. In some embodiments, top chamber 140 has a height of at least two hundred and not more than three hundred micrometers.

Bottom chamber 150 has a height, h2. In some embodiments, the height of bottom chamber 150 is sufficient to accommodate the motion of cooling element 120. For example, the height of bottom chamber 150 may be sufficiently large to accommodate the maximum amplitude of vibration of cooling element 120. Thus, no portion of cooling element 120 contacts orifice plate 130 during normal operation in some embodiments. Bottom chamber 150 is generally smaller than top chamber 140 and may aid in reducing the backflow of fluid into orifices 132. In some embodiments, the height of bottom chamber 150 is the maximum deflection of cooling element 120 plus at least five micrometers and not more than ten micrometers. In some embodiments, the deflection of cooling element 120 (e.g. the deflection of tip 121), z, has an amplitude of at least ten micrometers and not more than one hundred micrometers. In some such embodiments, the amplitude of deflection of cooling element 120 is at least ten micrometers and not more than sixty micrometers. However, the amplitude of deflection of cooling element 120 depends on factors such as the desired flow rate through cooling system 100 and the configuration of cooling system 100. Thus, the height of bottom chamber 150 generally depends on the flow rate through and other components of cooling system 100.

Top plate 110 includes vent 112 through which fluid may be drawn into cooling system 100. Top vent 112 may have a size chosen based on the desired acoustic pressure in chamber 140. For example, in some embodiments, the width, w, of vent 112 is at least five hundred micrometers and not more than one thousand micrometers. In some embodiments, the width of vent 112 is at least two hundred fifty micrometers and not more than two thousand micrometers. In the embodiment shown, vent 112 is a centrally located aperture in top plate 110. In other embodiments, vent 112 may be located elsewhere. For example, vent 112 may be closer to one of the edges of top plate 110. Vent 112 may have a circular, rectangular or other shaped footprint. Although a single vent 112 is shown, multiple vents might be used. For example, vents may be offset toward the edges of top chamber 140 or be located on the side(s) of top chamber 140. Although top plate 110 is shown as substantially flat, in some embodiments trenches and/or other structures may be provided in top plate 110 to modify the configuration of top chamber 140 and/or the region above top plate 110.

Anchor (support structure) 160 supports cooling element 120 at the central portion of cooling element 120. Thus, at least part of the perimeter of cooling element 120 is unpinned and free to vibrate. In some embodiments, anchor 160 extends along a central axis of cooling element 120 (e.g. perpendicular to the page in FIGS. 1A-1F). In such embodiments, portions of cooling element 120 that vibrate (e.g. including tip 121) move in a cantilevered fashion. Thus, portions of cooling element 120 may move in a manner analogous to the wings of a butterfly (i.e. in phase) and/or analogous to a seesaw (i.e. out of phase). Thus, the portions of cooling element 120 that vibrate in a cantilevered fashion do so in phase in some embodiments and out of phase in other embodiments. In some embodiments, anchor 160 does not extend along an axis of cooling element 120. In such embodiments, all portions of the perimeter of cooling element 120 are free to vibrate (e.g. analogous to a jellyfish). In the embodiment shown, anchor 160 supports cooling element 120 from the bottom of cooling element 120. In other embodiments, anchor 160 may support cooling element 120 in another manner. For example, anchor 160 may support cooling element 120 from the top (e.g. cooling element 120 hangs from anchor 160). In some embodiments, the width, a, of anchor 160 is at least 0.5 millimeters and not more than four millimeters. In some embodiments, the width of anchor 160 is at least two millimeters and not more than 2.5 millimeters. Anchor 160 may occupy at least ten percent and not more than fifty percent of cooling element 120.

Cooling element 120 has a first side distal from heat-generating structure 102 and a second side proximate to heat-generating structure 102. In the embodiment shown in FIGS. 1A-1F, the first side of cooling element 120 is the top of cooling element 120 (closer to top plate 110) and the second side is the bottom of cooling element 120 (closer to orifice plate 130). Cooling element 120 is actuated to undergo vibrational motion as shown in FIGS. 1A-1F. The vibrational motion of cooling element 120 drives fluid from the first side of cooling element 120 distal from heat-generating structure 102 (e.g. from top chamber 140) to a second side of cooling element 120 proximate to heat-generating structure 102 (e.g. to bottom chamber 150). The vibrational motion of cooling element 120 also draws fluid through vent 112 and into top chamber 140; forces fluid from top chamber 140 to bottom chamber 150; and drives fluid from bottom chamber 150 through orifices 132 of orifice plate 130. Thus, cooling element 120 may be viewed as an actuator. Although described in the context of a single, continuous cooling element, in some embodiments, cooling element 120 may be formed by two (or more) cooling elements. Each of the cooling elements is depicted as one portion pinned (e.g. supported by support structure 160) and an opposite portion unpinned. Thus, a single, centrally supported cooling element 120 may be formed by a combination of multiple cooling elements supported at an edge.

Cooling element 120 has a length, L, that depends upon the frequency at which cooling element 120 is desired to vibrate. In some embodiments, the length of cooling element 120 is at least four millimeters and not more than ten millimeters. In some such embodiments, cooling element 120 has a length of at least six millimeters and not more than eight millimeters. The depth of cooling element 120 (e.g. perpendicular to the plane shown in FIGS. 1A-1F) may vary from one fourth of L through twice L. For example, cooling element 120 may have the same depth as length. The thickness, t, of cooling element 120 may vary based upon the configuration of cooling element 120 and/or the frequency at which cooling element 120 is desired to be actuated. In some embodiments, the cooling element thickness is at least two hundred micrometers and not more than three hundred and fifty micrometers for cooling element 120 having a length of eight millimeters and driven at a frequency of at least twenty kilohertz and not more than twenty-five kilohertz. The length, C, of chamber 140/150 is close to the length, L, of cooling element 120. For example, in some embodiments, the distance, d, between the edge of cooling element 120 and the wall of chamber 140/150 is at least one hundred micrometers and not more than five hundred micrometers. In some embodiments, d is at least two hundred micrometers and not more than three hundred micrometers.

Cooling element 120 may be driven at a frequency that is at or near both the resonant frequency for an acoustic resonance of a pressure wave of the fluid in top chamber 140 and the resonant frequency for a structural resonance of cooling element 120. The portion of cooling element 120 undergoing vibrational motion is driven at or near resonance (the "structural resonance") of cooling element 120. This portion of cooling element 120 undergoing vibration may be a cantilevered section in some embodiments. The frequency of vibration for structural resonance is termed the structural resonant frequency. Use of the structural resonant frequency in driving cooling element 120 reduces the power consumption of cooling system 100. Cooling element 120 and top chamber 140 may also be configured such that this structural resonant frequency corresponds to a resonance in a pressure wave in the fluid being driven through top chamber 140 (the acoustic resonance of top chamber 140). The frequency of such a pressure wave is termed the acoustic resonant frequency. At acoustic resonance, a node in pressure occurs near vent 112 and an antinode in pressure occurs near the periphery of cooling system 100 (e.g. near tip 121 of cooling element 120 and near the connection between top chamber 140 and bottom chamber 150). The distance between these two regions is C/2. Thus, C/2=nλ/4, where λ is the acoustic wavelength for the fluid and n is odd (e.g. n=1, 3, 5, etc.). For the lowest order mode, C=λ/2. Because the length of chamber 140 (e.g. C) is close to the length of cooling element 120, in some embodiments, it is also approximately true that L/2=nλ/4, where λ is the acoustic wavelength for the fluid and n is odd. Thus, the frequency at which cooling element 120 is driven, v, is at or near the structural resonant frequency for cooling element 120. The frequency v is also at or near the acoustic resonant frequency for at least top chamber 140. The acoustic resonant frequency of top chamber 140 generally varies less dramatically with parameters such as temperature and size than the structural resonant frequency of cooling element 120. Consequently, in some embodiments, cooling element 120 may be driven at (or closer to) a structural resonant frequency rather than to the acoustic resonant frequency.

Orifice plate 130 has orifices 132 and cavities 134 therein. Although a particular number and distribution of orifices 132 and cavities 134 are shown, another number and/or another distribution may be used. Cavities 134 may be configured differently or may be omitted. In some embodiments, other cavities may be within flow chamber 140/150 or the jet channel between orifice plate 130 and heat-generating structure 102. For example, cavities may be included in top plate 110 within flow chamber 140/150 or in the bottom of orifice plate 130. A single orifice plate 130 is used for a single cooling system 100. In other embodiments, multiple cooling systems 100 may share an orifice plate. For example, multiple cells 100 may be provided together in a desired configuration. In such embodiments, the cells 100 may be the same size and configuration or different size(s) and/or configuration(s). Orifices 132 are shown as having an axis oriented normal to a surface of heat-generating structure 102. In other embodiments, the axis of one or more orifices 132 may be at another angle. For example, the angle of the axis may be selected from substantially zero degrees and a nonzero acute angle. Orifices 132 also have sidewalls that are substantially parallel to the normal to the surface of orifice plate 130. In some embodiments, orifices may have sidewalls at a nonzero angle to the normal to the surface of orifice plate 130. For example, orifices 132 may be cone-shaped. Further, although orifice place 130 is shown as substantially flat, in some embodiments, trenches and/or other structures may be provided in orifice plate 130 to modify the configuration of bottom chamber 150 and/or the region between orifice plate 130 and heat-generating structure 102.

The size, distribution and locations of orifices 132 are chosen to control the flow rate of fluid driven to the surface of heat-generating structure 102. The locations and configurations of orifices 132 may be configured to increase/maximize the fluid flow from bottom chamber 150 through orifices 132 to the jet channel (the region between the bottom of orifice plate 130 and the top of heat-generating structure 102). The locations and configurations of orifices 132 may also be selected to reduce/minimize the suction flow (e.g. back flow) from the jet channel through orifices 132. For example, the locations of orifices are desired to be sufficiently far from tip 121 that suction in the upstroke of cooling element 120 (tip 121 moves away from orifice plate 130) that would pull fluid into bottom chamber 150 through orifices 132 is reduced. The locations of orifices are also desired to be sufficiently close to tip 121 that suction in the upstroke of cooling element 120 also allows a higher pressure from top chamber 140 to push fluid from top chamber 140 into bottom chamber 150. In some embodiments, the ratio of the flow rate from top chamber 140 into bottom chamber 150 to the flow rate from the jet channel through orifices 132 in the upstroke (the "net flow ratio") is greater than 2:1. In some embodiments, the net flow ratio is at least 85:15. In some embodiments, the net flow ratio is at least 90:10. In order to provide the desired pressure, flow rate, suction, and net flow ratio, orifices 132 are desired to be at least a distance, r1, from tip 121 and not more than a distance, r2, from tip 121 of cooling element 120. In some embodiments, r1 is at least one hundred micrometers (e.g. r1≥100 μm) and r2 is not more than one millimeter (e.g. r2≤1000 μm). In some embodiments, orifices 132 are at least two hundred micrometers from tip 121 of cooling element 120 (e.g. r1≥200 μm). In some such embodiments, orifices 132 are at least three hundred micrometers from tip 121 of cooling element 120 (e.g. r1≥300 μm). In some embodiments, orifices 132 have a width, o, of at least one hundred micrometers and not more than five hundred micrometers. In some embodiments, orifices 132 have a width of at least two hundred micrometers and not more than three hundred micrometers. In some embodiments, the orifice separation, s, is at least one hundred micrometers and not more than one millimeter. In some such embodiments, the orifice separation is at least four hundred micrometers and not more than six hundred micrometers. In some embodiments, orifices 132 are also desired to occupy a particular fraction of the area of orifice plate 130. For example, orifices 132 may cover at least five percent and not more than fifteen percent of the footprint of orifice plate 130 in order to achieve a desired flow rate of fluid through orifices 132. In some embodiments, orifices 132 cover at least eight percent and not more than twelve percent of the footprint of orifice plate 130.

In some embodiments, cooling element 120 is actuated using a piezoelectric. Thus, cooling element 120 may be a piezoelectric cooling element. Cooling element 120 may be driven by a piezoelectric that is mounted on or integrated into cooling element 120. In some embodiments, cooling element 120 is driven in another manner including but not limited to providing a piezoelectric on another structure in cooling system 100. Cooling element 120 and analogous cooling elements are referred to hereinafter as piezoelectric cooling elements though it is possible that a mechanism other than a piezoelectric might be used to drive the cooling element. In some embodiments, cooling element 120 includes a piezoelectric layer on substrate. The substrate may include or consist of stainless steel, a Ni alloy, Hastelloy, Al (e.g. an Al alloy), and/or Ti (e.g. a Ti alloy such as Ti6Al-4V). In some embodiments, a piezoelectric layer includes multiple sublayers formed as thin films on the substrate. In other embodiments, the piezoelectric layer may be a bulk layer affixed to the substrate. Such a piezoelectric cooling element 120 also includes electrodes used to activate the piezoelectric. The substrate functions as an electrode in some embodiments. In other embodiments, a bottom electrode may be provided between the substrate and the piezoelectric layer. Other layers including but not limited to seed, capping, passivation, or other layers might be included in the piezoelectric cooling element. Thus, cooling element 120 may be actuated using a piezoelectric.

In some embodiments, cooling system 100 includes chimneys (not shown) or other ducting. Such ducting provides a path for heated fluid to flow away from heat-generating structure 102. In some embodiments, ducting returns fluid to the side of top plate 110 distal from heat-generating structure 102. In some embodiments, ducting may instead direct fluid away from heat-generating structure 102 in a direction parallel to heat-generating structure 102 or perpendicular to heat-generating structure 102 but in the opposite direction (e.g. toward the bottom of the page). For a device in which fluid external to the device is used in cooling system 100, the ducting may channel the heated fluid to a vent. In such embodiments, additional fluid may be provided from an inlet vent. In embodiments, in which the device is enclosed, the ducting may provide a circuitous path back to the region near vent 112 and distal from heat-generating structure 102. Such a path allows for the fluid to dissipate heat before being reused to cool heat-generating structure 102. In other embodiments, ducting may be omitted or configured in another manner. Thus, the fluid is allowed to carry away heat from heat-generating structure 102.

Operation of cooling system 100 is described in the context of FIGS. 1A-1F. Although described in the context of particular pressures, gap sizes, and timing of flow, operation of cooling system 100 is not dependent upon the explanation herein. FIGS. 1C-1D depict in-phase operation of cooling system 100. Referring to FIG. 1C, cooling element 120 has been actuated so that its tip 121 moves away from top plate 110. FIG. 1C can thus be considered to depict the end of a down stroke of cooling element 120. Because of the vibrational motion of cooling element 120, gap 152 for bottom chamber 150 has decreased in size and is shown as gap 152B. Conversely, gap 142 for top chamber 140 has increased in size and is shown as gap 142B. During the down stroke, a lower (e.g. minimum) pressure is developed at the periphery when cooling element 120 is at the neutral position. As the down stroke continues, bottom chamber 150 decreases in size and top chamber 140 increases in size as shown in FIG. 1C. Thus, fluid is driven out of orifices 132 in a direction that is at or near perpendicular to the surface of orifice plate 130 and/or the top surface of heat-generating structure 102. The fluid is driven from orifices 132 toward heat-generating structure 102 at a high speed, for example in excess of thirty-five meters per second. In some embodiments, the fluid then travels along the surface of heat-generating structure 102 and toward the periphery of heat-generating structure 102, where the pressure is lower than near orifices 132. Also in the down stroke, top chamber 140 increases in size and a lower pressure is present in top chamber 140. As a result, fluid is drawn into top chamber 140 through vent 112. The motion of the fluid into vent 112, through orifices 132, and along the surface of heat-generating structure 102 is shown by unlabeled arrows in FIG. 1C.

Cooling element 120 is also actuated so that tip 121 moves away from heat-generating structure 102 and toward top plate 110. FIG. 1D can thus be considered to depict the end of an up stroke of cooling element 120. Because of the motion of cooling element 120, gap 142 has decreased in size and is shown as gap 142C. Gap 152 has increased in size and is shown as gap 152C. During the upstroke, a higher (e.g. maximum) pressure is developed at the periphery when cooling element 120 is at the neutral position. As the upstroke continues, bottom chamber 150 increases in size and top chamber 140 decreases in size as shown in FIG. 1D. Thus, the fluid is driven from top chamber 140 (e.g. the periphery of chamber 140/150) to bottom chamber 150. Thus, when tip 121 of cooling element 120 moves up, top chamber 140 serves as a nozzle for the entering fluid to speed up and be driven towards bottom chamber 150. The motion of the fluid into bottom chamber 150 is shown by unlabeled arrows in FIG. 1D. The location and configuration of cooling element 120 and orifices 132 are selected to reduce suction and, therefore, back flow of fluid from the jet channel (between heat-generating structure 102 and orifice plate 130) into orifices 132 during the upstroke. Thus, cooling system 100 is able to drive fluid from top chamber 140 to bottom chamber 150 without an undue amount of backflow of heated fluid from the jet channel entering bottom chamber 150. Moreover, cooling system 100 may operate such that fluid is drawn in through vent 112 and driven out through orifices 132 without cooling element 120 contacting top plate 110 or orifice plate 130. Thus, pressures are developed within chambers 140 and 150 that effectively open and close vent 112 and orifices 132 such that fluid is driven through cooling system 100 as described herein.

The motion between the positions shown in FIGS. 1C and 1D is repeated. Thus, cooling element 120 undergoes vibrational motion indicated in FIGS. 1A-1D, drawing fluid through vent 112 from the distal side of top plate 110 into top chamber 140; transferring fluid from top chamber 140 to bottom chamber 150; and pushing the fluid through orifices 132 and toward heat-generating structure 102. As discussed above, cooling element 120 is driven to vibrate at or near the structural resonant frequency of cooling element 120. Further, the structural resonant frequency of cooling element 120 is configured to align with the acoustic resonance of the chamber 140/150. The structural and acoustic resonant frequencies are generally chosen to be in the ultrasonic range. For example, the vibrational motion of cooling element 120 may be at frequencies from 15 kHz through 30 kHz. In some embodiments, cooling element 120 vibrates at a frequency/frequencies of at least 20 kHz and not more than 30 kHz. In some embodiments, cooling element vibrates at a frequency of at least 23 kHz and not more than 26 kHz. The structural resonant frequency of cooling element 120 is within ten percent of the acoustic resonant frequency of cooling system 100. In some embodiments, the structural resonant frequency of cooling element 120 is within five percent of the acoustic resonant frequency of cooling system 100. In some embodiments, the structural resonant frequency of cooling element 120 is within three percent of the acoustic resonant frequency of cooling system 100. Consequently, efficiency and flow rate may be enhanced. However, other frequencies may be used.

Fluid driven toward heat-generating structure 102 may move substantially normal (perpendicular) to the top surface of heat-generating structure 102. In some embodiments, the fluid motion may have a nonzero acute angle with respect to the normal to the top surface of heat-generating structure 102. In either case, the fluid may thin and/or form apertures in the boundary layer of fluid at heat-generating structure 102. As a result, transfer of heat from heat-generating structure 102 may be improved. The fluid deflects off of heat-generating structure 102, traveling along the surface of heat-generating structure 102. In some embodiments, the fluid moves in a direction substantially parallel to the top of heat-generating structure 102. Thus, heat from heat-generating structure 102 may be extracted by the fluid. The fluid may exit the region between orifice plate 130 and heat-generating structure 102 at the edges of cooling system 100. Chimneys or other ducting (not shown) at the edges of cooling system 100 allow fluid to be carried away from heat-generating structure 102. In other embodiments, heated fluid may be transferred further from heat-generating structure 102 in another manner. The fluid may exchange the heat transferred from heat-generating structure 102 to another structure or to the ambient environment. Thus, fluid at the distal side of top plate 110 may remain relatively cool, allowing for the additional extraction of heat. In some embodiments, fluid is circulated, returning to the distal side of top plate 110 after cooling. In other embodiments, heated fluid is carried away and replaced by new fluid at the distal side of cooling element 120. As a result, heat-generating structure 102 may be cooled.

FIGS. 1E-1F depict an embodiment of active MEMS cooling system 100 including centrally anchored cooling element 120 in which the cooling element is driven out-of-phase. More specifically, sections of cooling element 120 on opposite sides of anchor 160 (and thus on opposite sides of the central region of cooling element 120 that is supported by anchor 160) are driven to vibrate out-of-phase. In some embodiments, sections of cooling element 120 on opposite sides of anchor 160 are driven at or near one hundred and eighty degrees out-of-phase. Thus, one section of cooling element 120 vibrates toward top plate 110, while the other section of cooling element 120 vibrates toward orifice plate 130/heat-generating structure 102. Movement of a section of cooling element 120 toward top plate 110 (an upstroke) drives fluid in top chamber 140 to bottom chamber 150 on that side of anchor 160. Movement of a section of cooling element 120 toward orifice plate 130 drives fluid through orifices 132 and toward heat-generating structure 102. Thus, fluid traveling at high speeds (e.g. speeds described with respect to in-phase operation) is alternately driven out of orifices 132 on opposing sides of anchor 160. Because fluid is driven through orifices 132 at high speeds, cooling system 100 may be viewed as a MEMs jet. The movement of fluid is shown by unlabeled arrows in FIGS. 1E and 1F. The motion between the positions shown in FIGS. 1E and 1F is repeated. Thus, cooling element 120 undergoes vibrational motion indicated in FIGS. 1A, 1E, and 1F, alternately drawing fluid through vent 112 from the distal side of top plate 110 into top chamber 140 for each side of cooling element 120; transferring fluid from each side of top chamber 140 to the corresponding side of bottom chamber 150; and pushing the fluid through orifices 132 on each side of anchor 160 and toward heat-generating structure 102. As discussed above, cooling element 120 is driven to vibrate at or near the structural resonant frequency of cooling element 120. Further, the structural resonant frequency of cooling element 120 is configured to align with the acoustic resonance of the chamber 140/150. The structural and acoustic resonant frequencies are generally chosen to be in the ultrasonic range. For example, the vibrational motion of cooling element 120 may be at the frequencies described for in-phase vibration. The structural resonant frequency of cooling element 120 is within ten percent of the acoustic resonant frequency of cooling system 100. In some embodiments, the structural resonant frequency of cooling element 120 is within five percent of the acoustic resonant frequency of cooling system 100. In some embodiments, the structural resonant frequency of cooling element 120 is within three percent of the acoustic resonant frequency of cooling system 100. Consequently, efficiency and flow rate may be enhanced. However, other frequencies may be used.

Fluid driven toward heat-generating structure 102 for out-of-phase vibration may move substantially normal (perpendicular) to the top surface of heat-generating structure 102, in a manner analogous to that described above for in-phase operation. Similarly, chimneys or other ducting (not shown) at the edges of cooling system 100 allow fluid to be carried away from heat-generating structure 102. In other embodiments, heated fluid may be transferred further from heat-generating structure 102 in another manner. The fluid may exchange the heat transferred from heat-generating structure 102 to another structure or to the ambient environment. Thus, fluid at the distal side of top plate 110 may remain relatively cool, allowing for the additional extraction of heat. In some embodiments, fluid is circulated, returning to the distal side of top plate 110 after cooling. In other embodiments, heated fluid is carried away and replaced by new fluid at the distal side of cooling element 120. As a result, heat-generating structure 102 may be cooled.

Although shown in the context of a uniform cooling element in FIGS. 1A-1F, cooling system 100 may utilize cooling elements having different shapes. FIG. 1G depicts an embodiment of engineered cooling element 120' having a tailored geometry and usable in a cooling system such as cooling system 100. Cooling element 120' includes an anchored region 122 and cantilevered arms 123. Anchored region 122 is supported (e.g. held in place) in cooling system 100 by anchor 160. Cantilevered arms 123 undergo vibrational motion in response to cooling element 120' being actuated. Each cantilevered arm 123 includes step region 124, extension region 126 and outer region 128. In the embodiment shown in FIG. 1G, anchored region 122 is centrally located. Step region 124 extends outward from anchored region 122. Extension region 126 extends outward from step region 124. Outer region 128 extends outward from extension region 126. In other embodiments, anchored region 122 may be at one edge of the actuator and outer region 128 at the opposing edge. In such embodiments, the actuator is edge anchored.

Extension region 126 has a thickness (extension thickness) that is less than the thickness of step region 124 (step thickness) and less than the thickness of outer region 128 (outer thickness). Thus, extension region 126 may be viewed as recessed. Extension region 126 may also be seen as providing a larger bottom chamber 150. In some embodiments, the outer thickness of outer region 128 is the same as the step thickness of step region 124. In some embodiments, the outer thickness of outer region 128 is different from the step thickness of step region 124. In some embodiments, outer region 128 and step region 124 each have a thickness of at least three hundred twenty micrometers and not more than three hundred and sixty micrometers. In some embodiments, the outer thickness is at least fifty micrometers and not more than two hundred micrometers thicker than the extension thickness. Stated differently, the step (difference in step thickness and extension thickness) is at least fifty micrometers and not more than two hundred micrometers. In some embodiments, the outer step (difference in outer thickness and extension thickness) is at least fifty micrometers and not more than two hundred micrometers. Outer region 128 may have a width, o, of at least one hundred micrometers and not more than three hundred micrometers. Extension region 126 has a length, e, extending outward from the step region of at least 0.5 millimeter and not more than 1.5 millimeters in some embodiments. In some embodiments, outer region 128 has a higher mass per unit length in the direction from anchored region 122 than extension region 126. This difference in mass may be due to the larger size of outer region 128, a difference in density between portions of cooling element 120, and/or another mechanism.

Use of engineered cooling element 120' may further improve efficiency of cooling system 100. Extension region 126 is thinner than step region 124 and outer region 128. This results in a cavity in the bottom of cooling element 120' corresponding to extension region 126. The presence of this cavity aids in improving the efficiency of cooling system 100. Each cantilevered arm 123 vibrates towards top plate 110 in an upstroke and away from top plate 110 in a downstroke. When a cantilevered arm 123 moves toward top plate 110, higher pressure fluid in top chamber 140 resists the motion of cantilevered arm 123. Furthermore, suction in bottom chamber 150 also resists the upward motion of cantilevered arm 123 during the upstroke. In the downstroke of cantilevered arm 123, increased pressure in the bottom chamber 150 and suction in top chamber 140 resist the downward motion of cantilevered arm 123. However, the presence of the cavity in cantilevered arm 123 corresponding to extension region 126 mitigates the suction in bottom chamber 150 during an upstroke. The cavity also reduces the increase in pressure in bottom chamber 150 during a downstroke. Because the suction and pressure increase are reduced in magnitude, cantilevered arms 123 may more readily move through the fluid. This may be achieved while substantially maintaining a higher pressure in top chamber 140, which drives the fluid flow through cooling system 100. Moreover, the presence of outer region 128 may improve the ability of cantilevered arm 123 to move through the fluid being driven through cooling system 100. Outer region 128 has a higher mass per unit length and thus a higher momentum. Consequently, outer region 128 may improve the ability of cantilevered arms 123 to move through the fluid being driven through cooling system 100. The magnitude of the deflection of cantilevered arm 123 may also be increased. These benefits may be achieved while maintaining the stiffness of cantilevered arms 123 through the use of thicker step region 124. Further, the larger thickness of outer region 128 may aid in pinching off flow at the bottom of a downstroke. Thus, the ability of cooling element 120' to provide a valve preventing backflow through orifices 132 may be improved. Thus, performance of cooling system 100 employing cooling element 120' may be improved.

Further, cooling elements used in cooling system 100 may have different structures and/or be mounted differently than depicted in FIGS. 1A-1G. In some embodiments, the cooling element may have rounded corners and/or rounded ends but still be anchored along a central axis such that cantilevered arms vibrate. The cooling element may be anchored only at its central region such that the regions surrounding the anchor vibrate in a manner analogous to a jellyfish or the opening/closing of an umbrella. In some such embodiments, the cooling element may be circular or elliptical in shape. In some embodiments, the anchor may include apertures through which fluid may flow. Such an anchor may be utilized for the cooling element being anchored at its top (e.g. to the top plate). Although not indicated in FIGS. 1A-1G, the piezoelectric utilized in driving the cooling element may have various locations and/or configurations. For example, the piezoelectric may be embedded in the cooling element, affixed to one side of the cooling element (or cantilevered arm(s)), may occupy some or all of the cantilevered arms, and/or may have a location that is close to or distal from the anchored region. In some embodiments, cooling elements that are not centrally anchored may be used. For example, a pair of cooling elements that have offset apertures, that are anchored at their ends (or all edges), and which vibrate out of phase may be used. Thus, various additional configurations of cooling element 120 and/or 120', anchor 160, and/or other portions of cooling system 100 may be used.

Using the cooling system 100 actuated for in-phase vibration or out-of-phase vibration of cooling element 120 and/or 120', fluid drawn in through vent 112 and driven through orifices 132 may efficiently dissipate heat from heat-generating structure 102. Because fluid impinges upon the heat-generating structure with sufficient speed (e.g. at least thirty meters per second) and in some embodiments substantially normal to the heat-generating structure, the boundary layer of fluid at the heat-generating structure may be thinned and/or partially removed. Consequently, heat transfer between heat-generating structure 102 and the moving fluid is improved. Because the heat-generating structure is more efficiently cooled, the corresponding integrated circuit may be run at higher speed and/or power for longer times. For example, if the heat-generating structure corresponds to a high-speed processor, such a processor may be run for longer times before throttling. Thus, performance of a device utilizing cooling system 100 may be improved. Further, cooling system 100 may be a MEMS device. Consequently, cooling systems 100 may be suitable for use in smaller and/or mobile devices, such as smart phones, other mobile phones, virtual reality headsets, tablets, two-in-one computers, wearables and handheld games, in which limited space is available. Performance of such devices may thus be improved. Because cooling element 120/120' may be vibrated at frequencies of 15 kHz or more, users may not hear any noise associated with actuation of cooling elements. If driven at or near structural and/or acoustic resonant frequencies, the power used in operating cooling systems may be significantly reduced. Cooling element 120/120' does not physically contact top plate 110 or orifice plate 130 during vibration. Thus, resonance of cooling element 120/120' may be more readily maintained. More specifically, physical contact between cooling element 120/120' and other structures disturbs the resonance conditions for cooling element 120/120'. Disturbing these conditions may drive cooling element 120/120' out of resonance. Thus, additional power would need to be used to maintain actuation of cooling element 120/120'. Further, the flow of fluid driven by cooling element 120/120' may decrease. These issues are avoided through the use of pressure differentials and fluid flow as discussed above. The benefits of improved, quiet cooling may be achieved with limited additional power. Further, out-of-phase vibration of cooling element 120/120' allows the position of the center of mass of cooling element 120/120' to remain more stable. Although a torque is exerted on cooling element 120/120', the force due to the motion of the center of mass is reduced or eliminated. As a result, vibrations due to the motion of cooling element 120/120' may be reduced. Moreover, efficiency of cooling system 100 may be improved through the use of out-of-phase vibrational motion for the two sides of cooling element 120/120'. Consequently, performance of devices incorporating the cooling system 100 may be improved. Further, cooling system 100 may be usable in other applications (e.g. with or without heat-generating structure 102) in which high fluid flows and/or velocities are desired.

In addition, cooling system 100 may have a high back pressure. Back pressure is a measure of the resistance to a fluid flow driven through a system. The back pressure may be considered to be the pressure at which flow through the system goes to zero. Stated differently, the back pressure may be the pressure at which the system can no longer drive fluid flow. Cooling system 100 may have a high back pressure. For example, in some embodiments, the back pressure of cooling system 100 may be on the order of 6-11 kPa. In some embodiments, the back pressure of cooling system 100 may be 8-10 kPa. As such, system 100 may be capable of driving fluid, and cooling heat-generating structure 102, even at pressures up to 8-10 kPa.

Figure 2A:
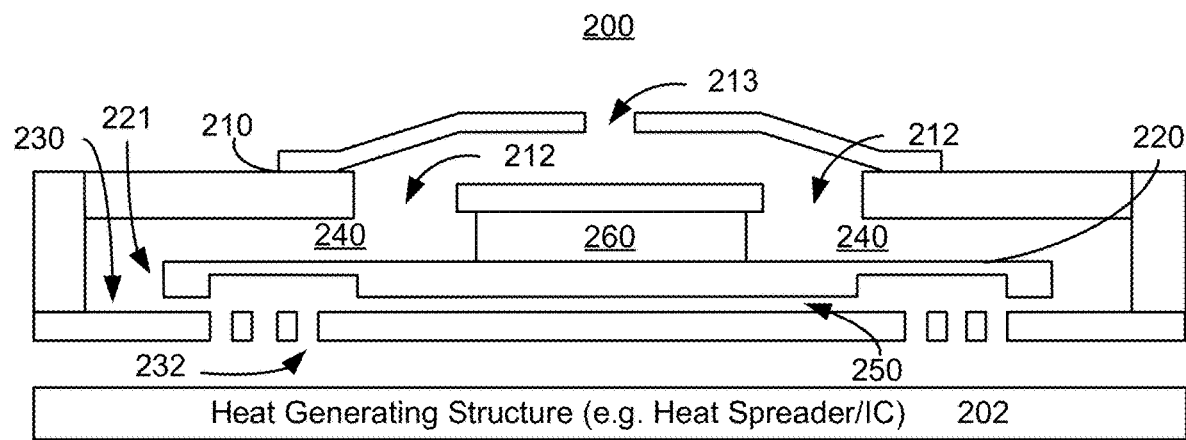
FIGS. 2A-2B depict an embodiment of an active MEMS cooling system including a centrally anchored cooling element.
Figure 2B:
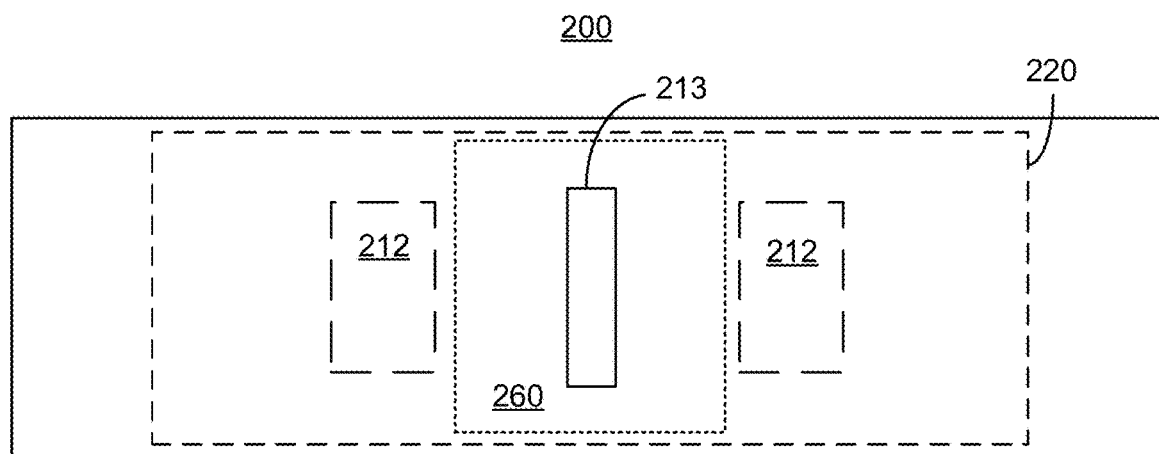

FIGS. 2A-2B depict an embodiment of active MEMS cooling system 200 including a top centrally anchored cooling element. FIG. 2A depicts a side view of cooling system 200 in a neutral position. FIG. 2B depicts a top view of cooling system 200. FIGS. 2A-2B are not to scale. For simplicity, only portions of cooling system 200 are shown. Referring to FIGS. 2A-2B, cooling system 200 is analogous to cooling system 100. Consequently, analogous components have similar labels. For example, cooling system 200 is used in conjunction with heat-generating structure 202, which is analogous to heat-generating structure 102.

Cooling system 200 includes top plate 210 having vents 212, cooling element 220 having tip 221, orifice plate 230 including orifices 232, top chamber 240 having a gap, bottom chamber 250 having a gap, flow chamber 240/250, and anchor (i.e. support structure) 260 that are analogous to top plate 110 having vent 112, cooling element 120 having tip 121, orifice plate 130 including orifices 132, top chamber 140 having gap 142, bottom chamber 150 having gap 152, flow chamber 140/150, and anchor (i.e. support structure) 160, respectively. Also shown is pedestal 290 that is analogous to pedestal 190. Thus, cooling element 220 is centrally supported by anchor 260 such that at least a portion of the perimeter of cooling element 220 is free to vibrate. In some embodiments, anchor 260 extends along the axis of cooling element 220. In other embodiments, anchor 260 is only near the center portion of cooling element 220. Although not explicitly labeled in FIGS. 2A and 2B, cooling element 220 includes an anchored region and cantilevered arms including step region, extension region, and outer regions analogous to anchored region 122, cantilevered arms 123, step region 124, extension region 126, and outer region 128 of cooling element 120'. In some embodiments, cantilevered arms of cooling element 220 are driven in-phase. In some embodiments, cantilevered arms of cooling element 220 are driven out-of-phase. In some embodiments, a simple cooling element, such as cooling element 120, may be used. Further, although cavities analogous to cavities 134 are not depicted in cooling system 200, such cavities may be present.

Anchor 260 supports cooling element 220 from above. Thus, cooling element 220 is suspended from anchor 260. Anchor 260 is suspended from top plate 210. Top plate 210 includes vent 213. Vents 212 on the sides of anchor 260 provide a path for fluid to flow into sides of chamber 240.

As discussed above with respect to cooling system 100, cooling element 220 may be driven to vibrate at or near the structural resonant frequency of cooling element 220. Further, the structural resonant frequency of cooling element 220 may be configured to align with the acoustic resonance of chamber 240/250. The structural and acoustic resonant frequencies are generally chosen to be in the ultrasonic range. For example, the vibrational motion of cooling element 220 may be at the frequencies described with respect to cooling system 100. Consequently, efficiency and flow rate may be enhanced. However, other frequencies may be used.

Cooling system 200 operates in an analogous manner to cooling system 100. Cooling system 200 thus shares the benefits of cooling system 100. Thus, performance of a device employing cooling system 200 may be improved. In addition, suspending cooling element 220 from anchor 260 may further enhance performance. In particular, vibrations in cooling system 200 that may affect other cooling cells (not shown) may be reduced. For example, less vibration may be induced in top plate 210 due to the motion of cooling element 220. Consequently, cross talk between cooling system 200 and other cooling systems (e.g. other cells) or other portions of the device incorporating cooling system 200 may be reduced. Thus, performance may be further enhanced.

Figure 3A:
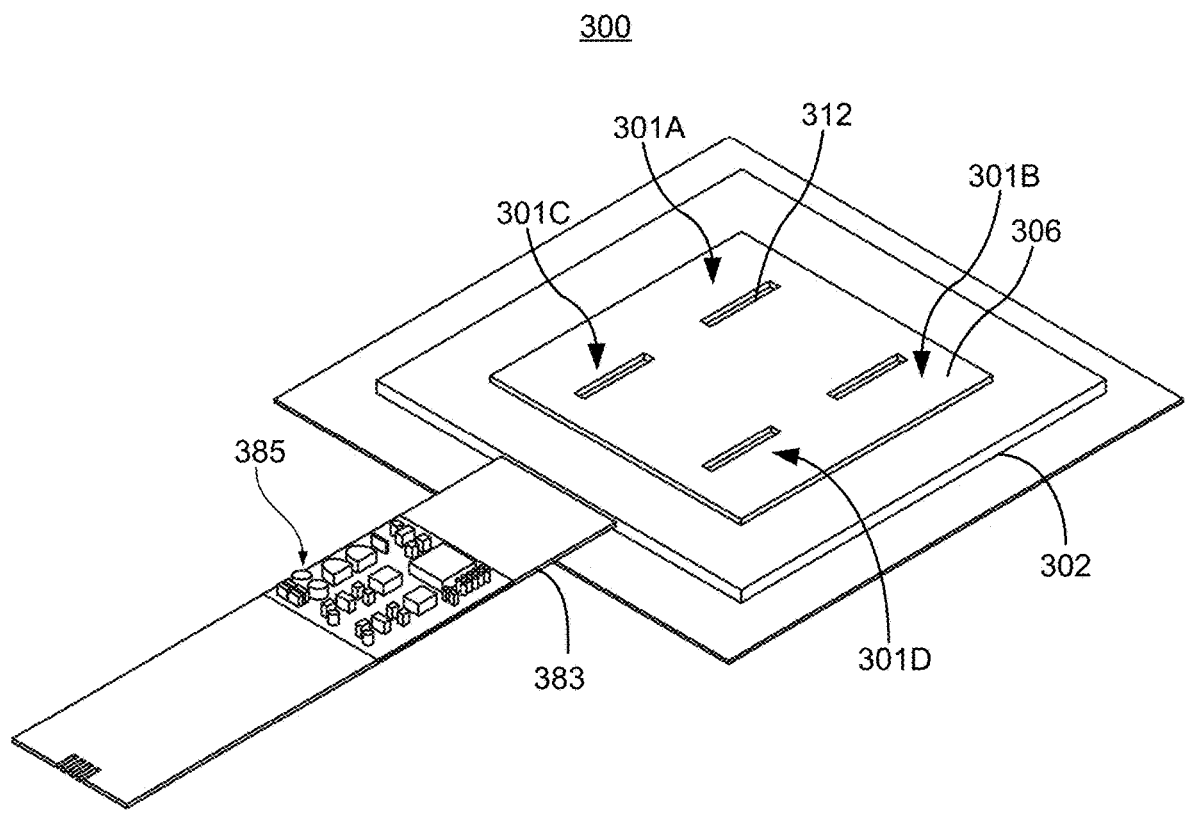
FIGS. 3A-3E depict an embodiment of an active MEMS cooling system formed in a tile.
Figure 3B:
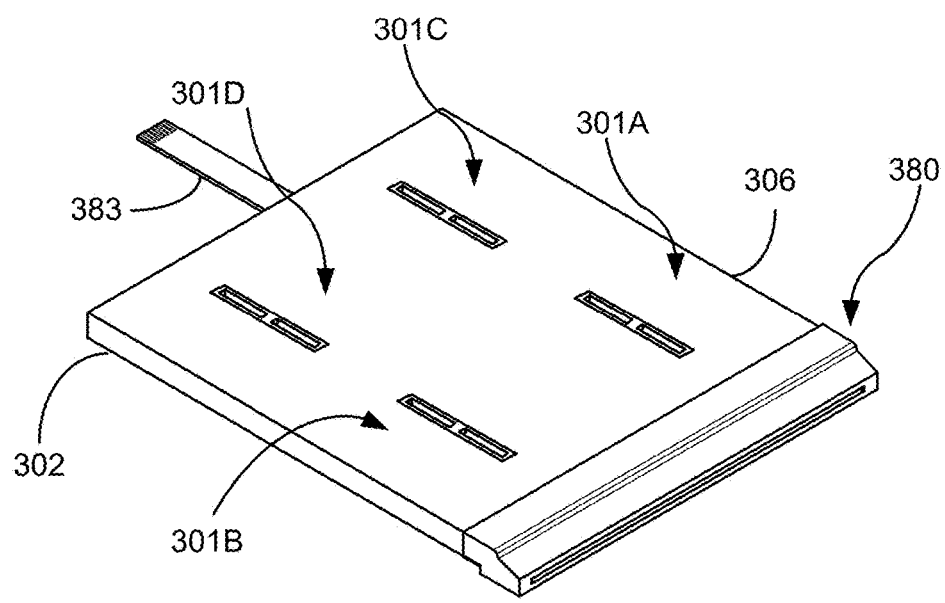
Figure 3C:
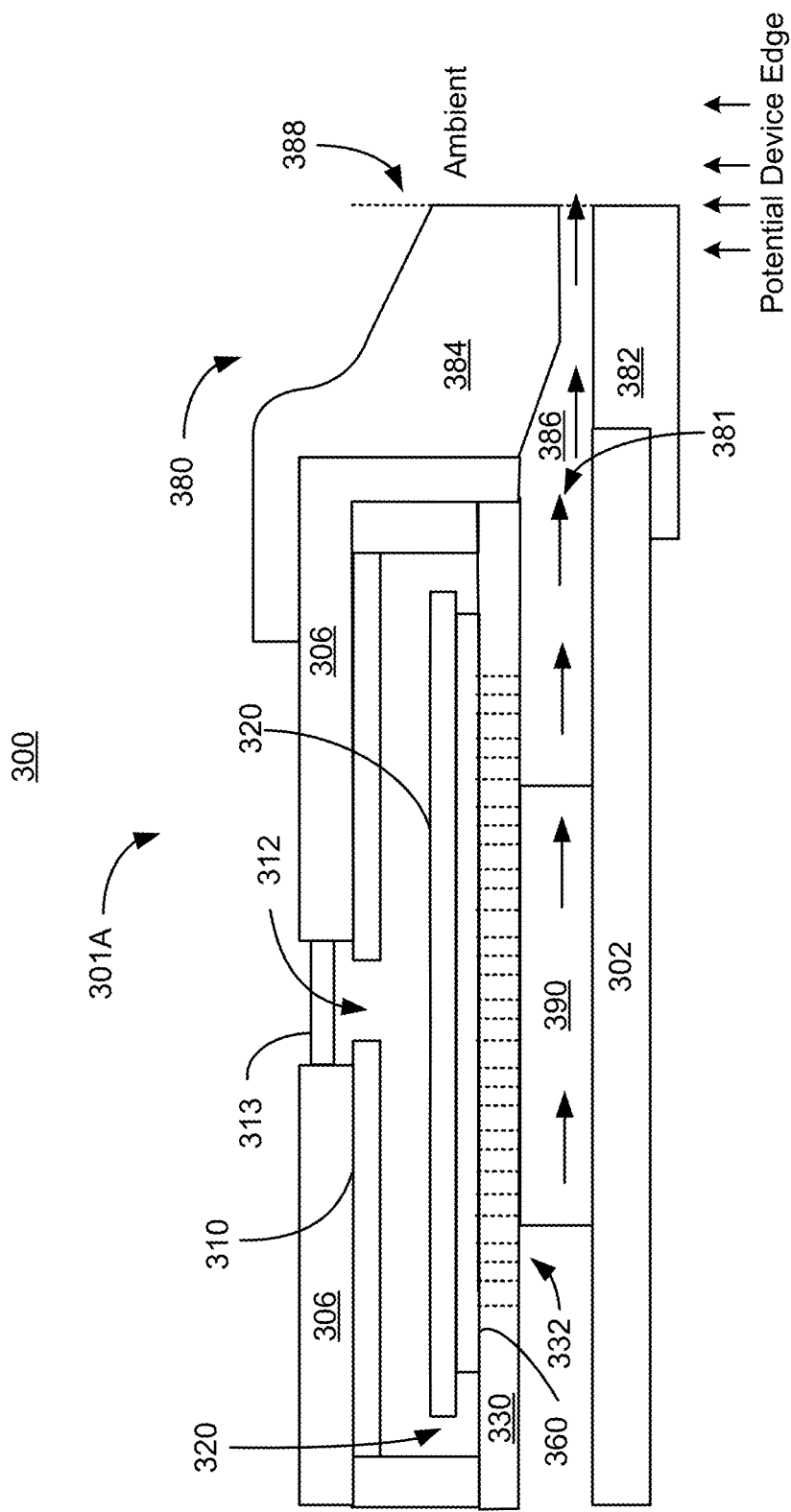
Figure 3D:
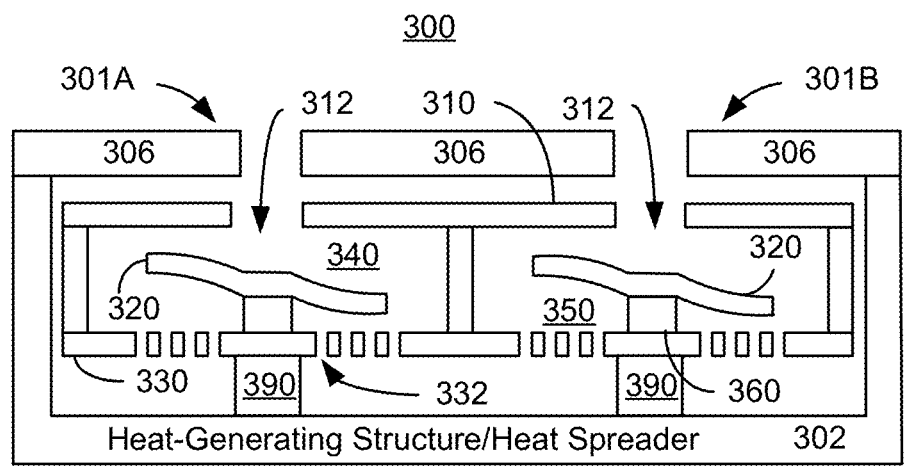
Figure 3E:
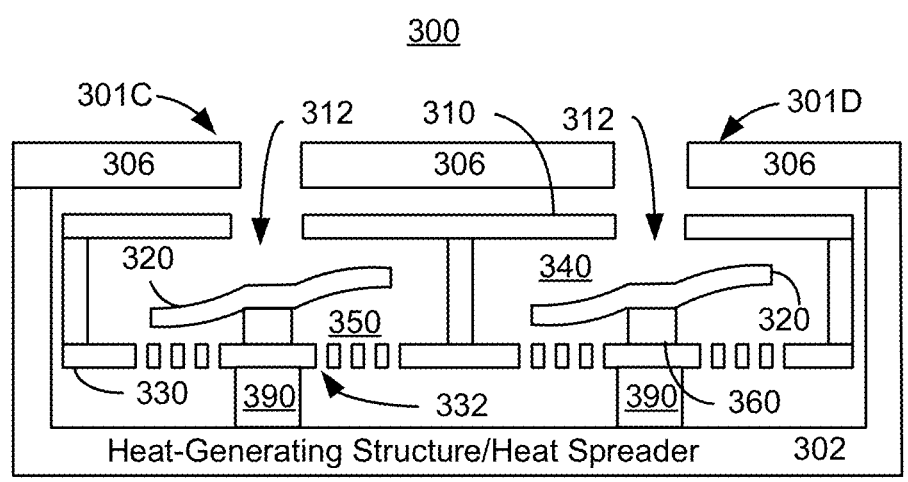

FIGS. 3A-3E depict an embodiment of active MEMS cooling system 300 including multiple cooling cells configured as a module termed a tile, or array. FIG. 3A depicts a perspective view with cover 306 and spout 380 removed. FIG. 3B depicts active MEMS cooling system 300 with cover 306 and spout 380. FIG. 3C depicts a side view of a portion of cooling system 300. FIGS. 3D-3E depict side views of cooling system 300. FIGS. 3A-3E are not to scale. Cooling system 300 includes four cooling cells 301A, 301B, 301C and 301D (collectively or generically 301), which are analogous to one or more of cooling systems described herein. More specifically, cooling cells 301 are analogous to cooling system 100 and/or 200. Tile 300 thus includes four cooling cells 301 (i.e. four MEMS jets). Although four cooling cells 301 in a 2×2 configuration are shown, in some embodiments another number and/or another configuration of cooling cells 301 might be employed. In the embodiment shown, cooling cells 301 include shared top plate 310 having apertures 312, cooling elements 320, shared orifice plate 330 including orifices 332, top chambers 340, bottom chambers 350, anchors (support structures) 360, and pedestals 390 that are analogous to top plate 110 having apertures 112, cooling element 120, orifice plate 130 having orifices 132, top chamber 140, bottom chamber 150, anchor 160, and pedestal 190. In some embodiments, cooling cells 301 may be fabricated together and separated, for example by cutting through top plate 310, side walls between cooling cells 301, and orifice plate 330. Thus, although described in the context of a shared top plate 310 and shared orifice plate 330, after fabrication cooling cells 301 may be separated. In some embodiments, tabs (not shown) and/or other structures such as anchors 360 may connect cooling cells 301. Further, tile 300 includes heat-generating structure (termed a heat spreader hereinafter) 302 (e.g. a heat spreader, a heat spreader, and/or other structure) that also has sidewalls, or fencing, in the embodiment shown. Cover 306 having apertures therein is also shown. In some embodiments, a dust filter (not shown) may be provided for the apertures. In such embodiments, dust may be less likely to reach the interior of cooling system 300. In some embodiments, a water tight, air porous membrane may be provided for the apertures. Heat spreader 302, cover 306, and spout 380 may be part of an integrated tile 300 as shown or may be separate from tile 300 in other embodiments. Heat spreader 302 and cover plate 306 may direct fluid flow outside of cooling cells 301, provide mechanical stability, and/or provide protection. Electrical connection to cooling cells 301 is provided via flex connector 383 (not shown in FIGS. 3C-3E) which may house drive electronics 385. Cooling elements 320 are driven out-of-phase (i.e. in a manner analogous to a seesaw). Further, as can be seen in FIGS. FIGS. 3D-3E cooling element 320 in one cell is driven out-of-phase with cooling element(s) 320 in adjacent cell(s). Cooling element 320 in cell 301C is out-of-phase with cooling element 320 in cell 301D. In FIGS. 3D-3E, cooling elements 320 in a column are driven out-of-phase. Thus, cooling element 320 in cell 301A is out-of-phase with cooling element 320 in cell 301C. Similarly, cooling element 320 in cell 301B is out-of-phase with cooling element 320 in cell 301D. By driving cooling elements 320 out-of-phase, vibrations in cooling system 300 may be reduced. Cooling elements 320 may be driven in another manner in some embodiments.

Cooling system 300 may also include spout 380 having dissipation region 386 therein. Thus, cooling system 300 including top cover 306 and heat spreader 302 may have a total thickness not exceeding four millimeters. In some embodiments, the height of cooling system 300 does not exceed 3.5 millimeters. In some embodiments, the height of cooling system 300 does not exceed 3 millimeters. In some embodiments, cooling system 300 has a height of at least 2 millimeters. Spout 380 includes a housing having bottom 382 and top 384, entrance 381 and exit 386. Entrance 381 is fluidically coupled with orifices 332 (i.e. egresses from flow chamber 340/350). The direction of fluid flow from flow chamber 340/350 may be seen by the unlabeled arrows in FIG. 3C. Spout 380 operates to smooth pulsations in the pressure waves generated by cooling elements 320. Because cooling elements 320 vibrate, the flow of fluid pulsates. Thus, the pressure of the fluid also pulsates between higher and lower pressures. Flow may also exit orifices 332 and travel through the jet channel in pulses. The pressure within flow chamber 340/350 and the jet channel is higher than the pressure of the ambient region. The fluid exits the jet channel and enters spout 380 at entrance 381. The fluid travels through dissipation region 386 and to exit 388. The pulsating pressure in the fluid is dissipated in dissipation region 384. Stated differently, the pulsating pressure way may be attenuated such that the pressure equilibrates and approaches (or reaches) the ambient pressure of the ambient region outside of system 300. In some embodiments, therefore, the pressure of the fluid at exit 388 of spout 380 matches or substantially the boundary conditions for the pressure of the ambient. In some embodiments of cooling system 300, spout 380 may be omitted. Also shown in FIG. 3C is optional dust guard 313. Dust guard 313 may be a MERV 14 or other analogous filter used to reduce or eliminate small particles from entering cooling system 300. Further, although cavities analogous to cavities 134 are not depicted in cooling system 300, such cavities may be present.

Cooling cells 301 of cooling system 300 function in an analogous manner to cooling system(s) 100, 200, and/or an analogous cooling system. Consequently, the benefits described herein may be shared by cooling system 300. Because cooling elements in nearby cells are driven out-of-phase, vibrations in cooling system 300 may be reduced. Because multiple cooling cells 301 are used, cooling system 300 may enjoy enhanced cooling capabilities. Further, multiples of individual cooling cells 301 and/or cooling system 300 may be combined in various fashions to obtain the desired footprint of cooling cells.

Systems 100, 200, and 300 are generally desired to be integrated into devices, such as computing devices, for which cooling is desired. In addition to space and other constraints, cooling systems such as systems 100, 200, and 300 are desired to maintain a higher rate of fluid flow, efficiently transfer heat from the heat-generating structure, and reduce the amount of heat transferred back into the device from the cooling systems. Thus, additional control of the fluid flow through the cooling system and the devices in which such systems are incorporated is desired.

Described herein are various embodiments of electronic devices including cooling systems (i.e. heats transfer systems), that incorporate cooling system(s) 100, 200, and/or 300 and/or an analogous cooling system(s). In some embodiments, the electronic devices include processors, which can be used to activate the cooling systems. For example, when the electronic device is switched on, reaches or exceeds a particular processor temperature, reaches or exceeds a particular skin (i.e. external surface) temperature, and/or reaches or exceeds another threshold, the electronic device activates the cooling system. This may include processor(s) in the electronic device providing a control signal to the cooling system. In some embodiments, the cooling system may control its own activation. For example, the cooling system may include a temperature sensor or other indicator and turn on in response to the temperature of the cooling system reaching or exceeding a particular temperature and/or other threshold being reached or exceeded.

Figure 4:
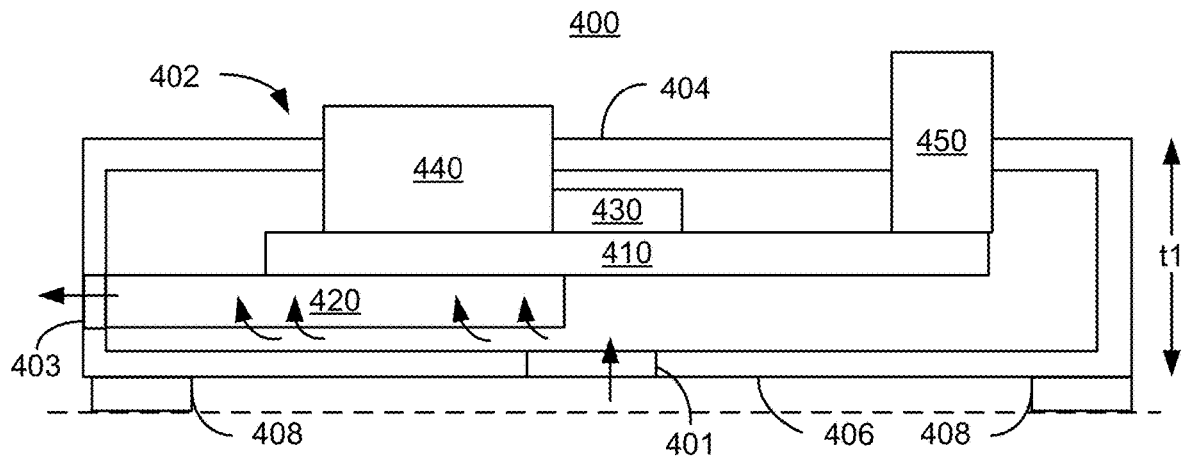
FIG. 4 depicts an embodiment of a doorbell camera including an active cooling system.

FIG. 4 depicts an embodiment of doorbell system 400 including active cooling system 420. For clarity, not all components may be shown and FIG. 4 is not to scale. Doorbell system 400 includes housing 402, heat spreader 410, cooling system 420, heat-generating device 430, camera 440, and doorbell activation module 450. In some embodiments, heat spreader 410 and heat-generating device 430 may be considered to be a heat-generating structure to which cooling system 420 is thermally coupled. Although depicted in FIG. 4 as being in physical contact (and thus coupled via thermal conduction), in some embodiments, cooling system 420 may be thermally coupled with heat-generating device 430 and/or heat spreader 410 by the fluid driven by cooling system 420 and used to cool doorbell system 400.

Housing 402 includes front cover 404 and back cover 406. Housing 402 is configured to be mounted to a structure, such as a building. Such a structure is indicated by the dashed line in FIG. 4. Although the dashed line is horizontal, doorbell system 400 may be mounted on a vertical (or other non-horizontal) surface. In the embodiment shown, housing 402 is separated from the structure by a gap formed by standoffs 408. Standoffs 408 may be part of housing 402 or part of another component (e.g. a mounting device). In some embodiments, another mechanism may be used to separate a portion of housing 402 from the structure. Housing 402 may have a smallest outside dimension (t1 in FIG. 4) of at least ten millimeters and not exceeding sixty millimeters. In some embodiments, the smallest outside dimension is not more than fifty millimeters. In some embodiments, the smallest outside dimension is not more than forty millimeters. Other sizes of housing 402 may be used in other embodiments.

Housing 402 also includes an inlet vent 401 for a fluid (e.g. air) and exit vent 403 for heated fluid driven by cooling system 420. Although one inlet vent 401 and one exit vent 403 are shown, multiple inlet vents and/or multiple exit vents may be present. In the embodiment shown, inlet vent 401 is in back cover 406. Thus, the gap provided by standoffs 408 allows fluid to flow into inlet vent 401. In some embodiments, the gap is at least one millimeter and not more than ten millimeters. In some such embodiments, the gap is at least five millimeters and not more than seven millimeters. Other gaps that allow fluid flow may be used in other embodiments. In some embodiments, inlet vent 401 may be in another location. For example, inlet vent 401 may be in the sides or front of housing 402. In some such embodiments, housing 402 might be mounted flush to the structure. Although not shown, inlet vent 401 may include a dust guard analogous to dust guard 313 and/or a vapor barrier. In the embodiment shown, exit vent 403 is at the side of housing 402. In other embodiments, exit vent 403 may be located elsewhere. In the embodiment shown, cooling system 420 is flush with exit vent 403. In some embodiments, a small space may exist between cooling system 420 and exit vent 403.

Doorbell activation module 450 may be a button or other mechanism used to activate a chime or other notification that an individual is present. Doorbell activation module 450 may also activate camera 440. In some embodiments, doorbell activation module 450 may include a motion detector or other component that automatically activates the chime and/or camera 440. In some embodiments, doorbell activation module 450 may also be used to provide audio communication between an individual in proximity to the doorbell and another individual (e.g. someone inside of the structure).

Camera 440 includes an image sensor and may be activated by button 450 or another component. Camera 540 may capture still and/or video images. In some embodiments, camera 440 captures images in the optical and/or infrared wavelength ranges. As such, camera 440 may be capable of capturing images during the day and at night.

Heat-generating device 430 may include one or more integrated circuits. For example, heat-generating device 430 may include a system-on-a chip (SoC) that includes one or more processors, the image sensor for camera 440, a wi-fi module, processor(s) for a motion detector, and/or other components that generate heat. An SoC may be used to process image data captured by an image sensor (i.e. camera 440), control cooling system 420, wi-fi (e.g. for communication), and/or other functions. Heat-generating device 430 is also coupled with heat spreader 410. Thus, heat generated by heat-generating device 430 may be transferred to heat spreader 410, then to cooling system 420. In some embodiments, heat-generating device 430 may be directly thermally coupled with cooling system 420 (e.g. with a heat spreader analogous to heat spreader 302).

Cooling system 420 is analogous to cooling system(s) 100, 200, and/or 300. Thus, cooling system 420 includes one or more active cooling cells (e.g. analogous to cooling cell 301). Although one cooling system 420 is shown, multiple may be present. Heat-generating device 430 is thermally coupled with cooling system 420 via heat spreader 410. The active cooling cell(s) of cooling system 420 utilize vibrational motion to drive a fluid for transferring heat from the heat-generating structure. More specifically, the fluid may be used to transfer heat from cooling system 420 and/or heat spreader 410. Because cooling system 420 has a low profile (e.g. not more than three to four millimeters in some embodiments), cooling system 420 may be coupled with and contained by housing 402.

Use of cooling system 420 in doorbell system 400 may improve performance. Heat-generating device 430 may be run at higher power without raising the external temperature of housing 402 beyond the desired range. For example, if heat-generating device 430 is an SoC, the SoC may have a temperature of eighty-six through ninety-two degrees Celsius and be run at powers in the range of 4.2-4.6 W while maintaining a skin temperature of housing 402 of not more than eighty degrees Celsius (e.g. at least sixty degrees Celsius and not more than seventy-eight degrees Celsius). For example, the back cover 406 may reach a temperature of at or near seventy-eight degrees Celsius in such conditions, while front cover 404 may remain under sixty degrees Celsius. Higher powers for such an SoC may allow for faster processing of data. In contrast, a passively cooled doorbell camera may only be run at an SoC power of approximately 1.5 W while maintaining an external temperature of not more than eight degrees Celsius for the housing. Alternatively, the SoC may be run at a lower power (e.g. 1.5 W) while maintaining an even lower temperature of housing 402. Thus, performance may be improved while maintaining the temperature of portions of doorbell system 400 in the desired ranges. Further, heat spreader 410 utilized may be significantly smaller in mass and/or volume than in a passively cooled doorbell camera. In addition, vibrational motion used by cooling system 420 may not adversely affect video quality (i.e. visible jitter may not be introduced). Thus, performance, size, and mass of the doorbell system 400 may be improved.

Figures 5A, 5B:
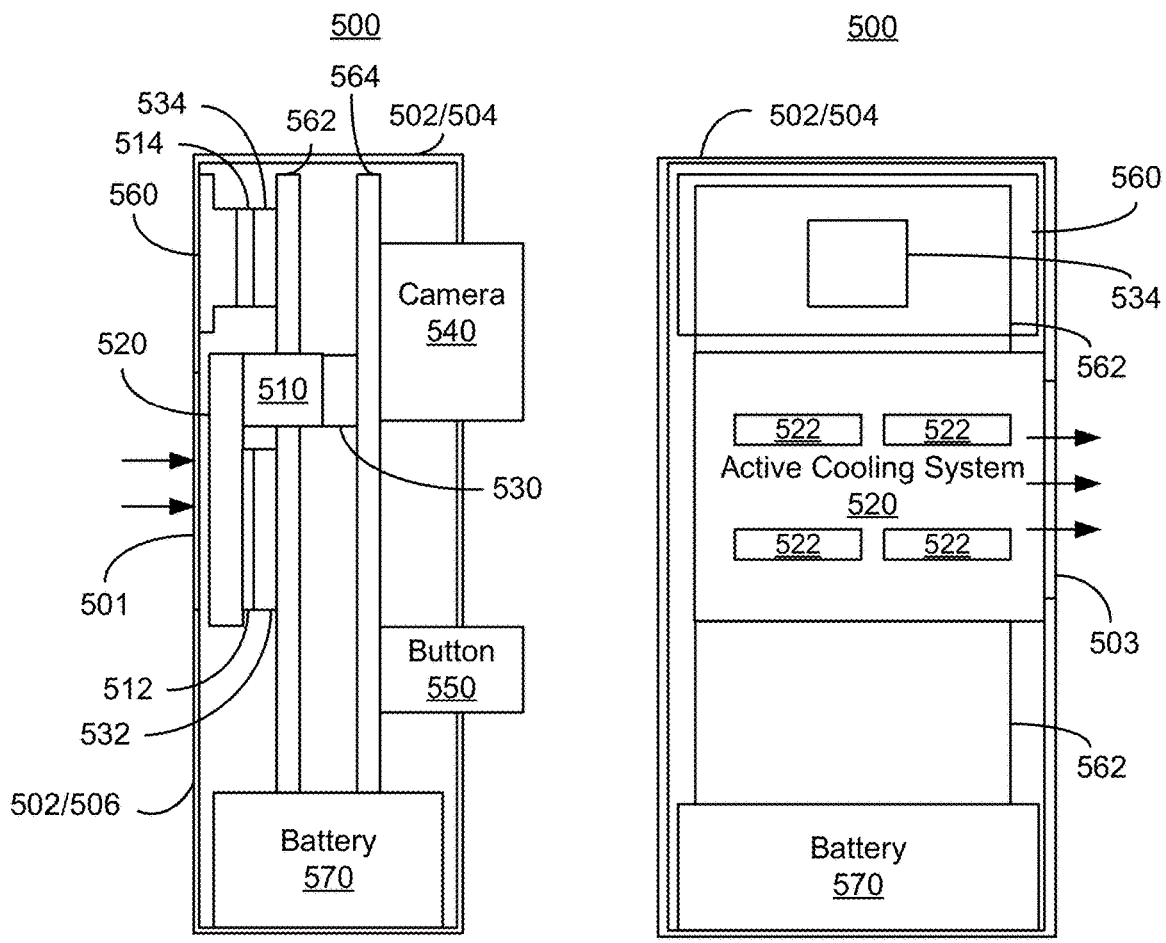
FIGS. 5A-5B depict an embodiment of a doorbell camera including an active cooling system.

FIGS. 5A-5B depict an embodiment of doorbell system 500 including active cooling system 520. FIG. 5A depicts a side view, while FIG. 5B depicts a top view. For clarity, not all components may be shown and FIGS. 5A-5B are not to scale. Doorbell system 500 includes housing 502 having front cover 504 and back cover 506, heat spreaders 510 and 512, cooling system 520, heat-generating devices 530 and 532, camera 540, and button 550 that are analogous to housing 402 having front cover 404 and back cover 406, heat spreader 410, cooling system 420, heat-generating device 430, camera 440, and doorbell activation module 450, respectively. For example, housing 502 may have the same smallest dimension (t1 in FIG. 5) as housing 402. Although depicted in FIGS. 5A-5B as being in physical contact (and thus coupled via thermal conduction), in some embodiments, cooling system 520 may be thermally coupled with heat-generating devices 530 and 532 and/or heat spreaders 510 and 512 by the fluid driven by cooling system 520 and used to cool doorbell system 500.

Also shown are circuit boards 562 and 564, additional heat-generating device 534, heat sink 560, battery 570, and gap pad 514. Although termed heat spreaders, components 510 and 512 are gap pads. Thus, gap pads 510, 512, and 514 thermally coupled heat-generating devices 530, 532, and 534 to cooling system 520 and heat sink 560. For example, gap pads 510 and 512 may thermally couple heat-generating devices 530 and 532 to a portion of cooling system 520 analogous to heat spreader 302.

In the embodiment shown, heat-generating device 530 is an image sensor, heat-generating device 532 is an SoC, and heat-generating device 534 is a wi-fi module (e.g. an integrated circuit). Although not explicitly shown, in some embodiments, doorbell system 500 may include a motion sensor and/or other components for additional functions. Cooling system 520 actively cools image sensor 530 and SoC 532. Although wi-fi module 534 is passively cooled by heat sink 560, in some embodiments, cooling system 520 may actively cool wi-fi module 534.

Cooling system 520 is analogous to cooling system(s) 100, 200, and/or 300. In the embodiment shown, cooling system 520 includes four cooling cells (e.g. analogous to cooling cell 301), each of which includes an inlet vent 522. In some embodiments, another number of cooling cells might be used. Although one cooling system 520 is shown, in some embodiments, multiple cooling systems may be used. Image sensor 530 and SoC 532 are thermally coupled with cooling system 520 via heat spreader (i.e. gap pads) 510 and 512, respectively. The active cooling cell(s) of cooling system 520 utilize vibrational motion to drive a fluid that transfers heat from the image sensor 530 and SoC 532. More specifically, heat is transferred from devices 530 and 532 through gap pads 510 and 512, respectively, to cooling system 520. Cooling system 520 drives the fluid that transfers heat from cooling system 520 through exit vent 503 to the environment outside of doorbell system 500. Because cooling system 520 has a low profile (e.g. not more than three to four millimeters in some embodiments), cooling system 520 may be coupled with and contained by housing 502.

Use of cooling system 520 in doorbell system 500 may improve performance. SoC 532 and/or image sensor 530 may be run at higher powers (as indicated by their temperatures) while maintaining the temperature of the exterior of housing 502 in the desired range. For example SoC 532 may draw powers in the range of 4.2-4.6 W while maintaining a skin temperature of housing 502 of not more than eighty degrees Celsius (e.g. at least sixty degrees Celsius and not more than seventy-eight degrees Celsius). For example, the back cover 506 may reach a temperature of at or near seventy-eight degrees Celsius in such conditions, while front cover 504 may remain under sixty degrees Celsius. Further, image sensor 530 and wi-fi module 534 may also be run without the external temperature of housing exceeding eighty degrees over a portion of back cover 506 and at exit vent 503 while front cover 504 remains at temperatures not exceeding sixty degrees Celsius. Alternatively, SoC 532 may be run at a lower power (e.g. 1.5 W) while maintaining an even lower temperature of housing 502. Higher powers for SoC 532 may allow for faster processing of data. Thus, performance may be improved while maintaining the temperature of portions of doorbell system 500 in the desired ranges. In addition, the high frequency vibration of the cooling elements in cooling system 530 may not adversely affect video quality (i.e. visible jitter may not be introduced). Further, heat spreaders used may be significantly smaller in mass and/or volume than in a passively cooled doorbell camera. For example, heat sink 560 may be used to manage heat from wi-fi module 534 only. Thus, heat sink 560 may be smaller. Thus, performance, size, and mass of the doorbell system 500 may be improved.

Figures 6, 7:
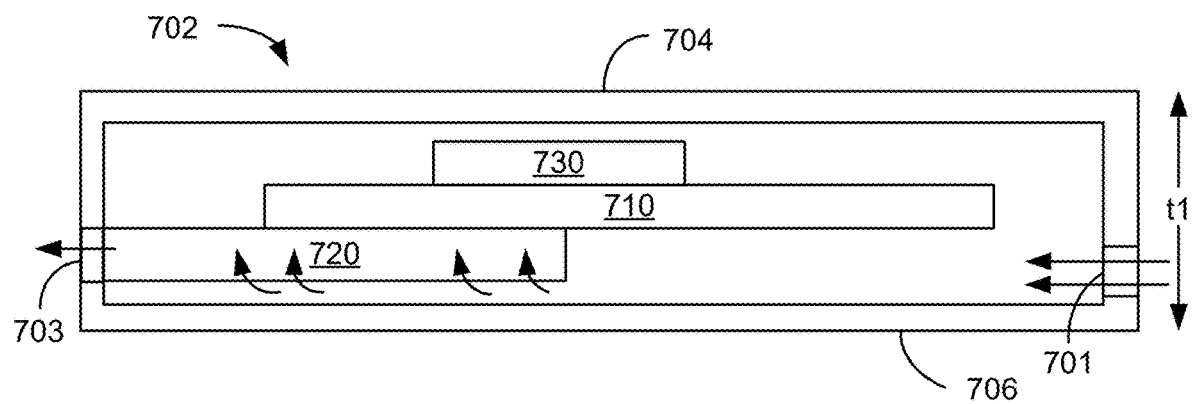
FIG. 6 depicts an embodiment of a method for utilizing an active cooling system in a doorbell camera.
FIG. 7 depicts an embodiment of a mini PC including an active cooling system.

FIG. 6 is a flow chart depicting an exemplary embodiment of method 600 for operating a differential pressure device. Method 600 may include steps that are not depicted for simplicity. Method 600 is described in the context of doorbell systems 400 and/or 500 and cooling systems 420 and/or 520. However, method 600 may be used with other cooling systems including but not limited to systems and cells described herein.

One or more of the cooling element(s) in cooling system is actuated to vibrate, at 602. At 602, an electrical signal having the desired frequency is used to drive the cooling element(s). In some embodiments, the cooling elements are driven at or near structural and/or acoustic resonant frequencies at 602. The driving frequency may be 15 kHz or higher. In some embodiments, the driving signal may be 20 kHz or higher. If multiple cooling elements are driven at 602, the cooling elements may be driven out-of-phase. In some embodiments, the cooling elements are driven substantially at one hundred and eighty degrees out of phase. Further, in some embodiments, individual cooling elements are driven out-of-phase. For example, different portions of a cooling element may be driven to vibrate in opposite directions (i.e. analogous to a seesaw). In some embodiments, individual cooling elements may be driven in-phase (i.e. analogous to a butterfly). In addition, the drive signal may be provided to the anchor(s), the cooling element(s), or both the anchor(s) and the cooling element(s). Further, the anchor may be driven to bend and/or translate.

Feedback from the piezoelectric cooling element(s) is used to adjust the driving current, at 604. In some embodiments, the adjustment is used to maintain the frequency at or near the acoustic and/or structural resonant frequency/frequencies of the cooling element(s) and/or cooling system. Resonant frequency of a particular cooling element may drift, for example due to changes in temperature. Adjustments made at 604 allow the drift in resonant frequency to be accounted for.

For example, piezoelectric cooling elements within cooling systems 420 and/or 520 may be driven at or near their structural resonant frequency/frequencies, at 602. Such cooling elements may correspond to cooling element 120 and/or 120'. This resonant frequency may also be at or near the acoustic resonant frequency for the top chamber 140. This may be achieved by driving piezoelectric layer(s) in anchor 160 and/or piezoelectric layer(s) in cooling element 120. Driving the cooling elements may occur in response to doorbell system 400 and/or 500 being activated. For example, doorbell module 450 or button 550 may be activated, camera 440/540 may be activated (e.g. by a motion sensor), or SoC 532 may activate cooling system 520. In some embodiments, the driving signal is configured to provide the desired amplitude of vibration for the cooling element(s). At 604, feedback is used to maintain cooling elements 120 at resonance and, in some embodiments in which multiple cooling elements are driven, one hundred and eighty degrees out of phase. Thus, the efficiency of cooling element 120 in driving fluid flow through differential pressure device 420 and/or 520 may be maintained. In some embodiments, 604 includes sampling the current through cooling element 120 and/or the current through anchor 160 and adjusting the current to maintain resonance and low input power.

Consequently, cooling systems 420 and/or 520 may be operated to drive fluid through a doorbell system. Thus, a door bell system may be more efficiently cooled than a conventional, passively cooled doorbell system. Thermal management and performance of such doorbell systems may be enhanced.

FIG. 7 depicts an embodiment of mini PC 700 including active cooling system 720. For clarity, not all components may be shown and FIG. 7 is not to scale. Mini PC 700 includes housing 702, heat spreader 710, cooling system 720, and heat-generating device 730. In some embodiments, heat spreader 710 and heat-generating device 730 may be considered to be a heat-generating structure to which cooling system 720 is thermally coupled. In some embodiments, heat spreader 710 might be omitted and heat-generating device 730 may be directly coupled to cooling system 720. Although depicted in FIG. 7 as being in physical contact (and thus coupled via thermal conduction), in some embodiments, cooling system 720 may be thermally coupled with heat-generating device 730 and/or heat spreader 710 by the fluid driven by cooling system 720 and used to cool mini PC 700. Mini PC 700 is generally suited for everyday tasks such as web browsing, media playback, and word processing. However, with the addition of cooling system 720, performance of mini PC 700 may be improved and/or functionality extended.

Housing 702 includes top cover 704 and back cover 706. Housing 702 may be on the order of 3-10 inches wide, 3-10 inches deep, and 2-4 inches tall. Thus, the smallest dimension of housing 702 (t1 in FIG. 7) may be on the order of not more than two inches through not more than four inches. In some embodiments, housing 702 is at least 2.5 inches tall. Other sizes of housing 702 may be used in other embodiments. Housing 702 also includes an inlet vent 701 for a fluid (e.g. air) and exit vent 703 for heated fluid driven by cooling system 720. In the embodiment shown, inlet vent 701 is in the sides of housing 702 and opposite to exit vent 703. In some embodiments, inlet vent 701 may be in another location. For example, inlet vent 701 may be in the top of housing 702. Although not shown, inlet vent 701 may include a dust guard analogous to dust guard 313 and/or a vapor barrier. In the embodiment shown, exit vent 703 is at the side of housing 702. In other embodiments, exit vent 703 may be located elsewhere. In the embodiment shown, cooling system 720 is flush with exit vent 703. In some embodiments, a small space may exist between cooling system 720 and exit vent 703.

Heat-generating device 730 may include one or more integrated circuits. For example, heat-generating device 730 may include one or more processors used by mini PC 700. For example, processor(s) 730 may be or include a central processing unit (CPU), graphics processing unit (GPU), general purpose processor such as a reduced instruction set processor (e.g. a RISC or ARM processor), and/or another analogous integrated circuit.

Cooling system 720 is analogous to cooling system(s) 100, 200, and/or 300. Although one cooling system 720 is shown, multiple may be present. Cooling system 720 may also be analogous to cooling system(s) 420 and/or 520. Thus, cooling system 720 includes one or more active cooling cells (e.g. analogous to cooling cell 301). Heat-generating device 730 is thermally coupled with cooling system 720 via heat spreader 710. The active cooling cell(s) of cooling system 720 utilize vibrational motion to drive a fluid for transferring heat from the heat-generating structure. More specifically, the fluid may be used to transfer heat from cooling system 720 and/or heat spreader 710. Because cooling system 720 has a low profile (e.g. not more than three to four millimeters in some embodiments), cooling system 720 may be coupled with and contained by housing 702.

Use of cooling system 720 in mini PC 700 may improve performance. Heat-generating device 730 (i.e. the processor(s) for mini PC 700) may be run at higher power without raising the external temperature of housing 702 beyond the desired range. For example, a CPU 730 may be run at 6.5 W of power, while the skin temperature of housing 702 remains below sixty degrees Celsius. In some embodiments, the skin temperature of housing 702 may remain below fifty-five or fifty degrees Celsius. In some cases the skin temperature is at least forty degrees Celsius. In a passively cooled mini PC, the skin temperature may be seventy degrees or more for such CPU powers. Similarly, the CPU 730 may be run at higher powers (e.g. 12-14 W) while maintaining skin temperatures of not more than seventy-five degrees Celsius. In some embodiments, the skin temperature (even at hot spots) may be not more than seventy degrees Celsius. Higher powers for such CPU may allow for faster processing of data. In some cases, processor(s) that consume more power may be utilized in connection with mini PC 700. Other and/or additional processors or other integrated circuits may also be used with mini PC 700 and cooled by cooling system 720. Thus, performance may be improved while maintaining the temperature of portions of mini PC 700 in the desired ranges. Further, heat spreader 710 utilized may be significantly smaller in mass and/or volume than in a passively cooled mini PC. A passively cooled mini PC may include a large, heavy, or bulky heat sink integrated into its back cover. In contrast, mini PC 700 may use a smaller, lighter heat spreader. For example, bottom cover 706 has been modified to remove or reduce the size of the copper heat spreader. Further, grooves in the top cover and/or bottom cover that would be used for thermal management may be omitted. In some embodiments, the weight of mini PC 700 may be reduced by at least ten percent, at least twenty percent, or more. Thus, mini PC 700 may have improved performance, a smaller size, and/or a reduced mass.

Figure 8:
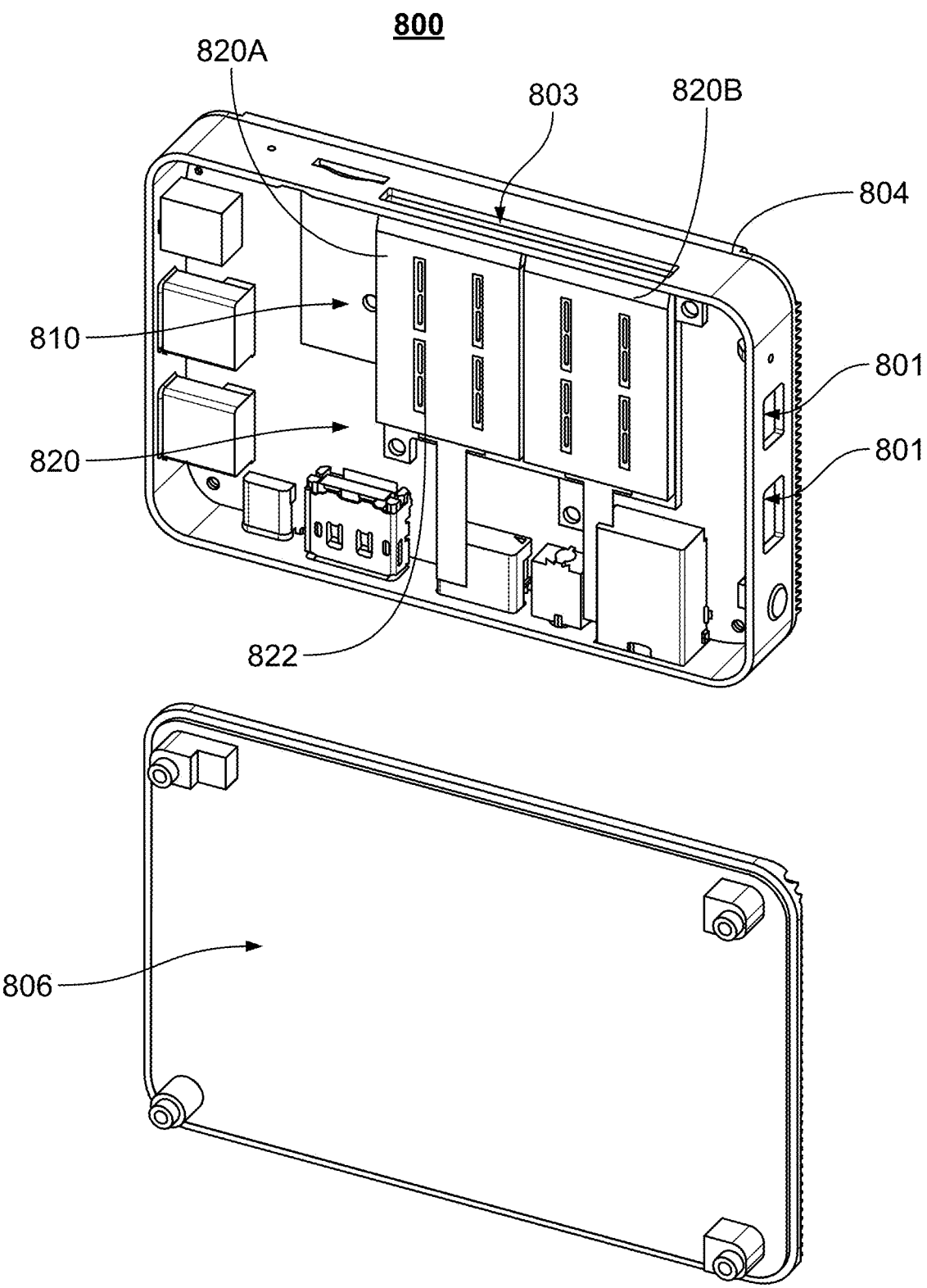
FIG. 8 depicts an embodiment of a mini PC including an active cooling system.

FIG. 8 depicts an embodiment of mini PC 800 including active cooling system 820. For clarity, not all components may be shown and FIG. 8 is not to scale. Mini PC 800 includes housing 802 having front cover 804 and back cover 806, heat spreader 810, and cooling system 820, that are analogous to housing 702 having front cover 704 and back cover 706, heat spreader 710, cooling system 720, respectively. For example, housing 802 may have the same smallest dimension (t1 in FIG. 8) as housing 702. Although not explicitly shown, a CPU is thermally coupled with heat spreader 810. In the embodiment shown, the CPU is a heat-generating device analogous to heat-generating device 730. Although depicted in FIG. 8 as being in physical contact (and thus coupled via thermal conduction), in some embodiments, cooling system 820 may be thermally coupled with heat-generating device 830 and/or heat spreaders 810 by the fluid driven by cooling system 820 and used to cool mini PC 800.

Cooling system 820 is analogous to cooling system(s) 100, 200, and/or 300. In the embodiment shown, cooling system 820 includes eight cooling cells (e.g. analogous to cooling cell 301), each of which includes an inlet vent 822 (only one of which is labeled). In some embodiments, another number of cooling cells might be used. Cooling system 820 may be considered to be made up of two cooling systems 820A and 820B, each of which includes four cooling cells. In some embodiments, another number of cooling systems may be used. The CPU is thermally coupled with cooling system 820 (i.e. cooling system 820A and 820B0 via heat spreader 810. The active cooling cell(s) of cooling system 820 utilize vibrational motion to drive a fluid that transfers heat from the CPU. More specifically, heat is transferred from the CPU to heat spreader 810 and to cooling system 820. Cooling system 820 drives the fluid that transfers heat from cooling system 820 through exit vent 803 to the environment outside of mini PC 800. Because cooling system 820 has a low profile (e.g. not more than three to four millimeters in some embodiments), cooling system 820 may be coupled with and contained by housing 802.

Mini PC 800 shares the benefits of mini PC 700. Use of cooling system 820 in mini PC 800 may improve performance of the CPU used, allow for additional and/or different processors to be used, and/or allow for other integrated circuits to be used. In addition, mini PC 800 may use a smaller, lighter heat spreader. In some embodiments, the weight of mini PC 800 may be reduced by at least ten percent, at least twenty percent, or more. Thus, mini PC 800 may have improved performance, a smaller size, and/or a reduced mass.

Figure 9:
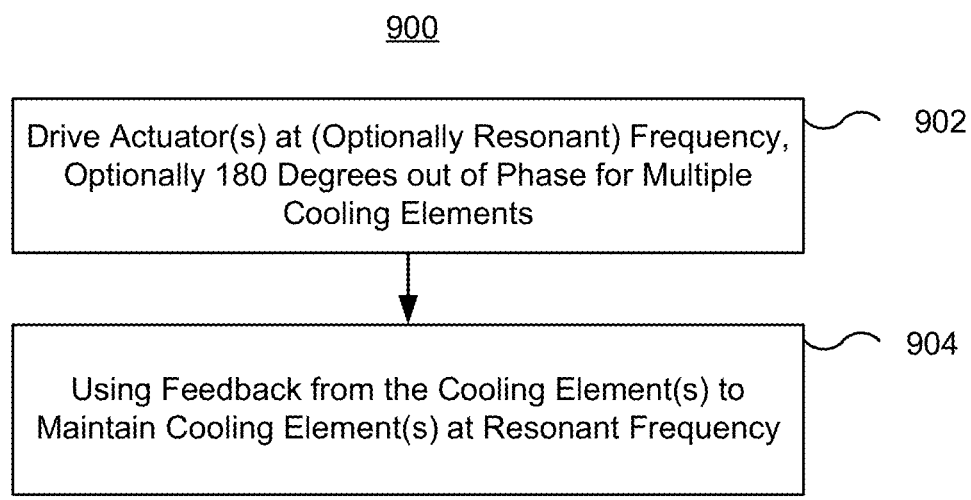
FIG. 9 depicts an embodiment of a method for utilizing an active cooling system in a mini PC.

FIG. 9 depicts an embodiment of method 900 for utilizing an active cooling system in a mini PC. Method 900 may include steps that are not depicted for simplicity. Method 900 is described in the context of differential pressure devices 100, 420 and/or 520. However, method 900 may be used with other cooling systems including but not limited to systems and cells described herein.

One or more of the cooling element(s) in a cooling system is actuated to vibrate, at 902. At 902, an electrical signal having the desired frequency is used to drive the cooling element(s). In some embodiments, the cooling elements are driven at or near structural and/or acoustic resonant frequencies at 902. The driving frequency may be 15 kHz or higher. In some embodiments, the driving signal may be 20 kHz or higher. If multiple cooling elements are driven at 902, the cooling elements may be driven out-of-phase. In some embodiments, the cooling elements are driven substantially at one hundred and eighty degrees out of phase. Further, in some embodiments, individual cooling elements are driven out-of-phase. For example, different portions of a cooling element may be driven to vibrate in opposite directions (i.e. analogous to a seesaw). In some embodiments, individual cooling elements may be driven in-phase (i.e. analogous to a butterfly). In addition, the drive signal may be provided to the anchor(s), the cooling element(s), or both the anchor(s) and the cooling element(s). Further, the anchor may be driven to bend and/or translate.

Feedback from the cooling element(s) is used to adjust the driving current, at 904. In some embodiments, the adjustment is used to maintain the frequency at or near the acoustic and/or structural resonant frequency/frequencies of the cooling element(s) and/or cooling system. Resonant frequency of a particular cooling element may drift, for example due to changes in temperature. Adjustments made at 904 allow the drift in resonant frequency to be accounted for.

For example, piezoelectric cooling elements within cooling systems 720 and/or 820 may be driven at or near their structural resonant frequency/frequencies, at 902. Such cooling elements may correspond to cooling element 120 and/or 120'. This resonant frequency may also be at or near the acoustic resonant frequency for the top chamber 140. This may be achieved by driving piezoelectric layer(s) in anchor 160 and/or piezoelectric layer(s) in cooling element 120. Driving the cooling elements may occur in response to mini PC 700 and/or 800 being activated or a particular temperature threshold being reached or exceeded. For example, mini PC 700 and/or 800 may be turned, the CPU may reach or exceed a particular operating temperature, and/or cooling system 720 and/or 820 may reach or exceed a particular temperature. In some embodiments, the driving signal is configured to provide the desired amplitude of vibration for the cooling element(s). At 904, feedback is used to maintain cooling elements 120 at resonance and, in some embodiments in which multiple cooling elements are driven, one hundred and eighty degrees out of phase. Thus, the efficiency of cooling element 120 in driving fluid flow through cooling system 720 and/or 820 may be maintained. In some embodiments, 904 includes sampling the current through cooling element 120 and/or the current through anchor 160 and adjusting the current to maintain resonance and low input power. Consequently, cooling systems 720 and/or 820 may be operated to drive fluid through a mini PC.

Thus, mini PCs may be more efficiently cooled. Thermal management, weight, size, and performance of mini PCs may thus be enhanced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A doorbell system, comprising:
   a housing configured to be coupled to a structure;
   a heat-generating structure coupled with the housing; and
   a cooling system including at least one active cooling cell, the heat-generating structure being thermally coupled with the cooling system, the at least one active cooling cell being configured to utilize vibrational motion to drive a fluid for transferring heat from the heat-generating structure, the cooling system being coupled with and contained by the housing.

2. The doorbell system of claim 1, further comprising:
   a camera, coupled with the housing and the heat-generating structure, the heat-generating structure including an integrated circuit.

3. The doorbell system of claim 2, wherein the integrated circuit includes a processor.

4. The doorbell system of claim 1, wherein the housing has a smallest outside dimension of at least ten millimeters and not exceeding sixty millimeters.

5. The doorbell system of claim 4, wherein the smallest outside dimension of not more than forty millimeters.

6. The doorbell system of claim 1, wherein the at least one cell includes at least one active cooling element configured to undergo the vibrational motion when driven.

7. The doorbell system of claim 6, wherein the cooling system includes a heat spreader thermally coupled with the at least one cooling element.

8. The doorbell system of claim 6, wherein the at least one active cooling cell further includes a top plate having at least one inlet and an orifice plate having a plurality of orifices therein, the at least one cooling element being between the top plate and the orifice plate, the vibrational motion of the at least one cooling element driving the fluid through the plurality of orifices such that the fluid has a speed of at least thirty meters per second after exiting at least one of the plurality of orifices.

9. The doorbell system of claim 1, wherein the housing has at least one aperture therein, the aperture allowing a fluid flow through the housing.

10. The doorbell system of claim 9, wherein the at least one aperture includes an inlet vent on a first side of the housing and an exit vent on a second side of the housing.

11. The doorbell system of claim 10, further comprising:
    a dust guard coupled with the inlet vent.

12. A doorbell system, comprising:
    a housing configured to be coupled to a wall of a structure;
    a camera;
    a heat-generating structure coupled with the camera and the housing; and
    a cooling system including a plurality of active cooling cells, the heat-generating structure being thermally coupled with the cooling system, each of the plurality of active cooling cells including a top plate having an inlet therein, a bottom plate having a plurality of orifices therein, and a cooling element between the top plate and the bottom plate, the cooling element being configured to utilize vibrational motion when driven to draw a fluid into each active cooling cell via the inlet, direct fluid toward the bottom plate, and drive the fluid through the orifices such that the fluid has a speed of at least thirty meters per second after leaving orifices, the fluid for transferring heat from the heat-generating structure, the cooling system being coupled with and contained by the housing.

13. A method, comprising:
driving a cooling element of an active cooling cell in a cooling system to induce a vibrational motion at a frequency, the cooling system being in a doorbell system including a housing and a heat-generating structure coupled with the housing and thermally coupled with the cooling system, the cooling element being configured to undergo the vibrational motion when driven to direct a fluid for transferring heat from the heat-generating structure, the cooling system being coupled with and contained by the housing.

14. The method of claim 13, wherein the doorbell system further includes a camera, coupled with the housing and the heat-generating structure, the heat-generating structure including an integrated circuit.

15. The method of claim 13, wherein the housing has a smallest outside dimension of at least ten millimeters and not exceeding sixty millimeters.

16. The method of claim 13, wherein the frequency corresponds to a resonant frequency for the cooling element.

17. The method of claim 13, wherein the active cooling cell further includes a top plate having at least one inlet and an orifice plate having a plurality of orifices therein, the cooling element being between the top plate and the orifice plate, the vibrational motion of the cooling element driving the fluid through the plurality of orifices such that the fluid has a speed of at least thirty meters per second after exiting at least one of the plurality of orifices.

18. The method of claim 13, wherein the housing has at least one aperture therein, the aperture allowing a fluid flow through the housing.

19. The method of claim 18, wherein the doorbell system further includes a dust guard coupled with the at least one aperture.

20. The method of claim 13, further comprising:
driving the cooling element in response to at least one of a doorbell system camera being activated, a skin temperature of the housing reaching or exceeding a first threshold, the doorbell system being activated, or a heat-generating structure temperature reaching or exceeding a second threshold.

* * * * *